United States Patent [19]
Bae et al.

[11] Patent Number: 5,545,367
[45] Date of Patent: Aug. 13, 1996

[54] RAPID PROTOTYPE THREE DIMENSIONAL STEREOLITHOGRAPHY

[75] Inventors: Young C. Bae, Pleasanton; David S. Soane, Piedmont; Charles Crocker, San Francisco, all of Calif.

[73] Assignee: Soane Technologies, Inc., Hayward, Calif.

[21] Appl. No.: 68,692

[22] Filed: May 27, 1993

Related U.S. Application Data

[63] Continuation-in-part of Ser. No. 59,128, May 7, 1993, and a continuation-in-part of Ser. No. 869,480, Apr. 15, 1992, abandoned.

[30] Foreign Application Priority Data

Apr. 15, 1993 [WO] WIPO .................. PCT/US93/03544

[51] Int. Cl.$^6$ .................. B29C 35/08; B29C 41/08
[52] U.S. Cl. .................. 264/401; 118/423; 118/620; 250/432 R; 475/174.4; 427/595; 430/270.1; 264/308
[58] Field of Search .................. 264/22, 23, 25, 264/255, 308, 401; 427/595; 118/423, 429, 620; 156/273.5, 275.5; 250/432 R, 492.1; 430/270; 425/174, 174.4

[56] References Cited

U.S. PATENT DOCUMENTS

| | | |
|---|---|---|
| 4,575,330 | 3/1986 | Hull . |
| 4,752,498 | 6/1988 | Fudim . |
| 4,801,477 | 1/1989 | Fudim . |
| 4,844,144 | 7/1989 | Murphy et al. . |
| 4,929,402 | 5/1990 | Hull . |
| 4,935,774 | 6/1990 | Ageishi et al. . |
| 4,942,001 | 7/1990 | Murphy et al. . |
| 4,943,928 | 7/1990 | Campbell et al. . |
| 4,945,032 | 7/1990 | Murphy et al. . |
| 4,972,006 | 11/1990 | Murphy et al. . |
| 4,990,827 | 2/1991 | Ehrfeld et al. . |
| 4,996,010 | 2/1991 | Modrek . |
| 4,996,282 | 2/1991 | Noren et al. . |
| 4,999,143 | 3/1991 | Hull et al. . |
| 5,011,635 | 4/1991 | Murphy et al. . |
| 5,015,424 | 5/1991 | Smalley . |
| 5,058,998 | 10/1991 | Spence . |
| 5,059,021 | 10/1991 | Spence et al. . |
| 5,059,266 | 10/1991 | Yamane et al. . |
| 5,059,359 | 10/1991 | Hull et al. . |
| 5,094,935 | 3/1992 | Vassiliou . |
| 5,139,338 | 8/1992 | Pomerantz et al. . |
| 5,157,423 | 10/1992 | Zur . |
| 5,174,931 | 12/1992 | Almquist . |

FOREIGN PATENT DOCUMENTS 2-103128  4/1990  Japan .

OTHER PUBLICATIONS

Murphy, F. L. et al., "Photographic Polymer Composition and Method of Forming a Three–Dimensional Object by Stereolithography," *Chemical Abstracts*, vol. 114, No. 04, (1991) Sec. 138, Abstract No. 025497.

Yamada, K., et al., "Formation of Precision 3–Dimension Resin Articles," *Chemical Abstracts*, vol. 115, No. 14 (1991) Sec. 138, Abstract No. 137733.

Hull, C. W., et al., "Powder or Liquid Coating Stereolithographic Parts," *Chemical Abstracts*, vol. 115, No. 06 (1991) Sec. 142, Abstract No. 051928.

(List continued on next page.)

*Primary Examiner*—Jill L. Heitbrink
*Attorney, Agent, or Firm*—Cheryl K. Zalesky; Kilpatrick & Cody

[57] ABSTRACT

Methods and apparatus are disclosed for the production of high precision large scale, micro and mini structures using three dimensional stereolithography. The objects formed using these methods have minimal stress between layers and low curl distortion. The objects also have low warpage because no post-cure treatment is necessary. The methods include the use of elevated pressure, elevated temperature, or sequential polymerization of polymer precursor fluid, or a combination of these, in the three dimensional stereolithographic process.

7 Claims, 15 Drawing Sheets

OTHER PUBLICATIONS

Krajewski, J. J. et al., "Lithography Process for Producing Three–Dimensional Thin–Walled Object" *Chemical Abstracts,* vol. 112 (1990), Abstract No. 45728r.

Herskowits, V., "Stereolithographic Materials–Real and Imaginary Requirements," RadTech '90 North America, vol. 1, Conference Proceedings, Chicago, Illinois, Mar. 25–29, 1990, pp. 227–232, 895.

Lightman A. J., et al., "Studies of Polypolymerization for Stereolithography Using Optical Diagnostics," 1991 *SAE Aerospace* Atlantic, Dayton, Ohio Apr. 22–26, 1991.

Charnas, D., "3D Systems Touts at NPE '91 Its Photoreactive Polymer" *Plastics News* Jul. 1, 1991 p. 7.

Wood, L., "Rapid Phototyping—Uphill, But Moving", Mechanical Engineering, vol. 14, Dec. 1990.

Guckel, H., et al., "On the Application of Deep X–Ray Lithography with Sacrificial Layers to Sensor and Actuator Construction (The Magnetic Micrometer with Power Takeoffs)," *Digest of Technical Papers,* 1991 International Conference on Solid–State Sensors and Actuators.

Becker, E. W., et al., "Fabrication of Microstructures with High Aspect Ratios and Great Structural Heights by Synchotron Radiation Lithography, Galvanoforming, and Plastic Moulding (LIGA Process)". *Microelectronic Engineering,* vol. 4 (1986) pp. 35–56.

IRRADIATION

DEVELOPMENT

GALVANOFORMING

RESIST REMOVAL

MOLD ASSEMBLY

MOLD FILLING

PART RETRIEVAL

PATTERN SACRIFICIAL (REMOVABLE) LAYER

SPUTTER PLATING BASE

CAST AND ANNEAL PMMA

ALIGN X-RAY MASK AND EXPOSE PMMA

DEVELOPE PMMA AND ELECTROPLATE Ni

REMOVE PMMA AND PLATING BASE TO CLEAR ACCESS TO THE SACRIFICIAL LAYER

ETCH SACRIFICIAL LAYER THEREBY UNDERCUTTING AND FREEING Ni STRUCTURE

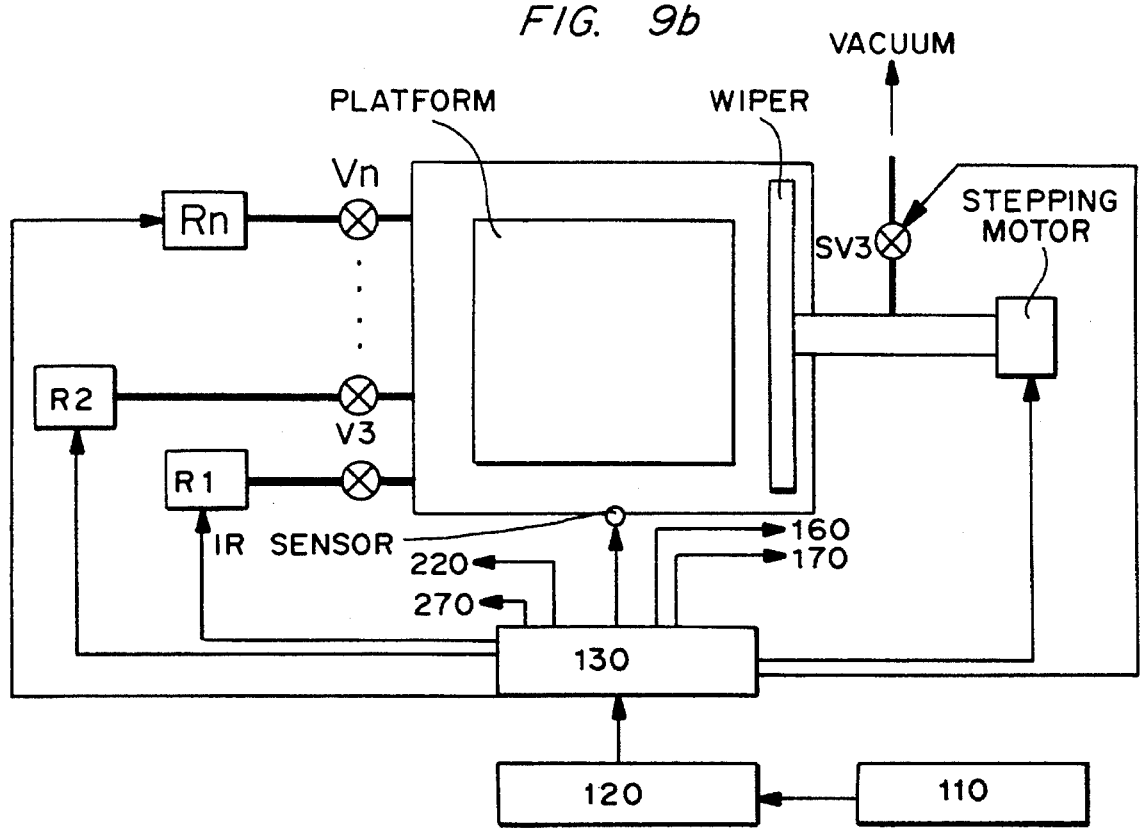
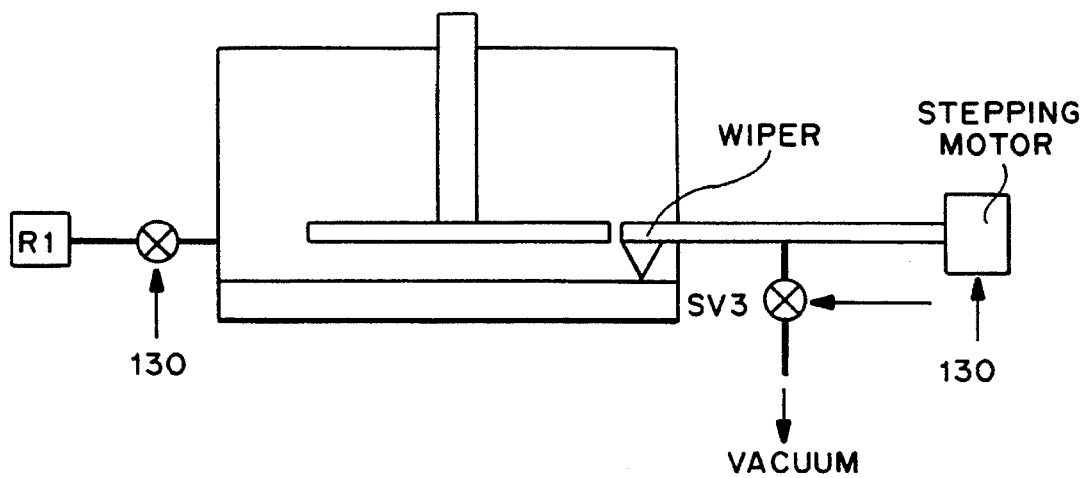

FIG. 13b
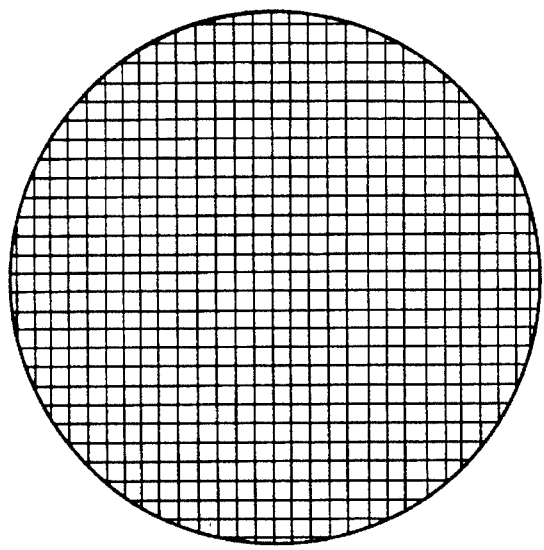
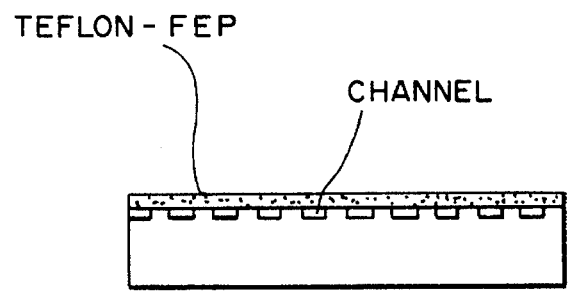
FIG. 13a
FIG. 13c
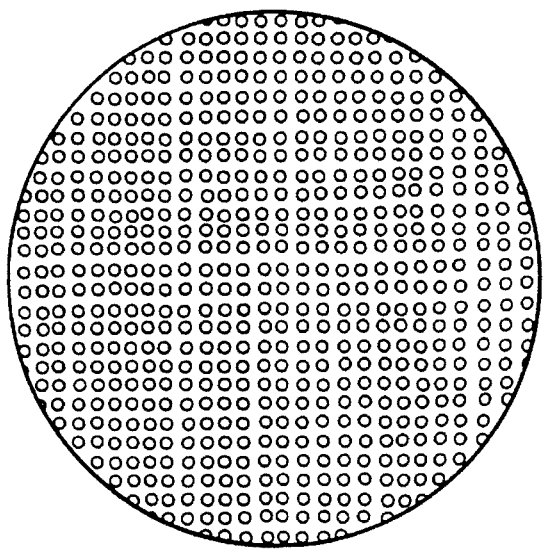

BUILD THE MOLD STRUCTURE BY RAPID PROTOTYPE THREE DIMENSIONAL STEREOLITHOGRAPHY

ELECTROPLATE WITH Ni

COMPLETE Ni STRUCTURE BY REMOVING THE MOLD

*LINES ARE LAYERS   MOLD

RAPID PROTOTYPE THREE DIMENSIONAL STEREOLITHOGRAPHY

This application is a continuation-in-part of U.S. Ser. No. 08/059,128, filed on May 7, 1993, which is a continuation of U.S. Ser. No. 07/869,480, filed on Apr. 15, 1992, now abandoned. This application also claims priority to PCT/US93/03544, filed on Apr. 15, 1993.

BACKGROUND OF THE INVENTION

This invention is in the area of rapid prototype, high precision three dimensional stereolithography.

Three dimensional stereolithography is a very recently developed prototyping technology for the rapid production of models for form-fit-and-function testing. The process is a revolutionary approach to the preparation of a wide variety of objects without tooling, with the assistance of computer assisted design (CAD) and computer assisted manufacture (CAM).

As disclosed in U.S. Pat. Nos. 4,575,330 and 4,929,402 to Hull, a CAD file of the desired object is prepared and converted mathematically into stacked cross-sections, or layers. The first layer of the object is scanned with a polymerization initiating source, typically an ultraviolet laser, on the surface of a vat of ethylenically unsaturated monomer, or mixture of monomers. The first layer of the model, that is positioned on an elevator platform in the vat, is then lowered a programmed amount with an actuator mechanism, so that a new coating of polymerizable liquid covers the solidified layer. A wiper blade perfects the coating depth, and then the laser draws a new layer on top of the preceding one. This procedure is repeated until the desired three dimensional structure is completed. Webbings can be added to the design as necessary to keep object protrusions from floating away. The prepared object (green body) is a partially cured structure. After removal from the vat, the green body is cured, and sanded, or otherwise smoothed, as necessary.

The '330 patent (see FIG. 4 of that patent) teaches, as an alternative embodiment, floating the ultraviolet-curable liquid on a heavier, immiscible, ultraviolet transparent liquid layer in the vat. In this embodiment, the UV source radiates from below the vat through the ultraviolet transparent material, and is focused at the interface of the two liquids. The object is pulled up out of the ultraviolet-curable liquid, rather than down and further into the liquid, as shown in FIG. 3. of '330. This embodiment is useful to minimize the amount of curable material used. However, the incompletely polymerized greenbody may experience sagging and distortion.

U.S. Pat. No. 5,011,635 to Murphy, et al., provides an apparatus for 3D-stereolithography that includes a fluid phase, a substantially impermeable, movable membrane positioned on top of the fluid phase, a radiation-polymerizable liquid organic phase positioned on top of the membrane and a radiation source positioned above the organic phase. This system also allows a reduction in the volume of polymerizable vat liquid needed in the apparatus. The presence of the membrane, however, adds complex material selection criteria.

U.S. Pat. No. 4,844,144 to Murphy discloses a method of investment casting using a model prepared by 3D-stereolithography, that includes using a polymer precursor fluid in the prototyping that includes an ethylenically unsaturated liquid material that is mixed with an inert low thermoplastic material that weakens the pattern when heated in the investment casting process to prevent thermal expansion of the pattern from cracking the mold. Weakening of parts may exacerbate distortion, leading to inexact finished objects.

The main problem associated with the use of 3D-stereolithography for prototyping is the lack of precise dimensional tolerance. One form of stress that causes distortion develops when material that is being converted from liquid to solid comes into contact with and bonds to previously cured material. This stress can result in curl distortion, wherein individual layers separate from the structure.

Another type of stress occurs when an incompletely polymerized object is annealed (cured by additional heat or blanket radiation, or both simultaneously), because the continuing reaction causes shrinkage of the precisely modeled part. Further, the high temperature needed for curing in the absence of radiation adversely affects the object. If the temperature of cure is too high, the object can soften, further losing its shape.

The extent of dimensional distortion is a function of the exact geometry and spatial design of the object, and the ability of the object to withstand stress, and will vary at different locations on the object. Presently, 3D-stereolithography techniques are limited in exactness to the order of a few thousandths of an inch, even with the use of sophisticated computer algorithms that predict and attempt to compensate for this shrinkage. Further, while post cure warpage may be decreased by increasing the percentage of vat cure, curl distortion increases dramatically as the vat cure reaches completion, due to a buildup of internal stress accompanying successive layer deposition under ambient pressure.

An attempt to solve the problem of post cure distortion is disclosed in U.S. Pat. No. 4,942,001 to Murphy, et al, that utilizes a vat solution that includes from 20 to 80 percent of a resinous polyacrylate or polymethacrylate dissolved in a combination of 10 to 45 weight percent of a liquid polyacrylate or polymethacrylate, which is preferably trifunctional, and 10 to 45 weight percent of N-vinyl monomer. The solution, on curing, provides a lightly cross-linked, solvent swellable, polymeric, thin walled element constituted by heat-softenable solid polymer. The addition of resinous polymers with monomers may increase the viscosity of the polymerizable mixture, slowing down the fluid movement and aggravating curl distortion.

U.S. Pat. No. 4,945,032 to Murphy, et al., discloses that post cure distortion can be reduced by stopping the exposure at any portion of the surface in the formation of the layer and then repeating the exposure at least once again in the production of each surface layer so that the strength and solvent resistance of the formed object are increased. The ultraviolet exposure of each surface layer is preferably carried out as a series of rapid repeated scans of a computer focused laser.

U.S. Pat. No. 4,972,006 to Murphy, et al., discloses that the green body can be cured by immersing it in an aqueous solution bath that includes a water soluble free radical catalyst that is absorbed by the green body. The bath is heated to complete the cure. Although additional cure can be accomplished by the catalyst in the aqueous solution, this approach does not improve the residual warpage problem caused in the post cure step.

U.S. Pat. Nos. 4,999,143 and 5,059,359 to Hull, et al., disclose that curl and distortion can be reduced by, among other things, defining the object in a way to provide built-in supports for the object (webs), and by dividing the surface of the solid model into triangles (PHIGS) using CAD, for better surface resolution. This mechanistic-based approach, while useful, leads to unnecessary and unwanted webs and supports, which must be trimmed away.

U.S. Pat. No. 5,015,424 to Smalley teaches that distortion can be reduced by isolating sections of an object so that stress cannot be transmitted from one section to another. Layer sections prone to curling are isolated by designing small holes or gaps at stress points in the CAD design or the part. These gaps are called "smalleys." Smalleys are also used to reduce birdsnesting (unsecured boundaries in the object that move up and down during manufacture, and give a rough surface finish to the object). This mechanistic-based approach similarly introduces unnecessary complications.

U.S. Pat. Nos. 5,076,974 and 5,164,128 describes a new part building technique called "Weave", which improves dimensional tolerances. Typical x-y cross-hatching methods produce a rather fragile matrix of thin-walled chambers that trap liquid or semi-cured resin inside in much the same way water is trapped in partially frozen ice cubes in a freezer tray.

Post-cure warpage is reduced and surface finish improved as a greater portion of the liquid resin is cured in the vat. Post-cure distortion decreases, in part, because there is less post-cure shrinkage. However, curl distortion resulting from the separation of layers from the structure dramatically increases as the extent of beam cross-hatching is increased and the degree of polymerization approaches 100%, due to the buildup of internal stress.

U.S. Pat. Nos. 5,139,338 and 5,157,423, assigned to Cubital Ltd. disclose a method to prepare three dimensional objects stereolithographically that employs a flood UV curing process as a means to eliminate problems associated with post-curing. Like all rapid prototyping processes, a solid or surface CAD model is first sliced into thin cross sections. A slice is then transferred from the computer to the mask generator, which operates like a photocopier: a negative image of the cross section is produced on a glass mask plate by charging portions of the surface and "developing" the electrostatic image with toner powder. Simultaneously, a thin layer of liquid photopolymer is spread across the surface of the workbench. The mask plate with the negative image of the crosssectional slice is then positioned over the workbench. A shutter above both the mask and the workbench opens for two seconds, allowing strong UV light from a 2-kilowatt lamp to solidify the exposed photopolymer layer all at once. Areas external to the model are left in liquid form.

The exposed mask is then physically wiped down and electrostatically discharged, erasing the mask plate and preparing it for the next negative cross-section image. At the same time, the uncured polymer is removed from the workbench by the combination of forced air and vacuum pressure and is collected for reuse. The workbench moves to the next station, where hot wax is laid down to fill the cavities left by the uncured polymer. At the next station, a cooling plate is applied to solidify the wax, which acts as a support structure to reduce distortion due to gravitational or shrinkage effects. Finally, the surface of the entire polymer/wax layer is milled with a cutter to the desired thickness, which makes the workpiece surface ready to accept the next polymer layer. The steps are repeated until the part is completed. After the model is constructed, the supporting wax is removed with microwave energy and hot air from a blower, and rinsed with solvent. Because each layer is fully cured, no post-curing is required. Although this process can be used to make high precision parts, the parts still exhibit some distortion due to buildup of stress between layers during polymerization.

U.S. Pat. Nos. 4,752,498 and 4,801,477 describe a method for forming three dimensional objects stereolithographically, in which a sufficiently rigid transparent plate or film is placed in contact with a liquid polymer precursor fluid to hold the fluid in a desired shape, and preferably exclude air from the reaction vat. The plate is not sealed on the vat so that volume changes in the vat are made up by the unrestricted supply of fluid from around the irradiated area. It is further suggested that the surface of the transparent plate be made of a material that leaves the irradiated polymer surface capable of further crosslinking so that when a subsequent layer is formed it will adhere thereto. The patents teach that the plate should be made of or contain in its molecules oxygen, copper or other inhibitors to aid in the release of the layer without distorting the solidified photopolymer.

The highest precision obtainable theoretically using the technique of three dimensional stereolithography is the diffraction limit of light (submicron). While the above-described techniques have been used to reduce the distortion of objects made by 3D-stereolithography, fine precision has not yet been attained. There remains a need to provide a method to produce form-fit-and-function models by 3D-stereolithography that provides improved precision.

High precision is necessary in the production of micro and ministructures for use in microelectronics that have high aspect ratio and significant structural height. Micro and ministructures are typically prepared by optical lithography, which has been perfected to attain the 0.5 μm critical dimension (CD) that is necessary for the fabrication of 16 Mbit memory chips. This technology has been modified to make microsensors and microactuators by either bulk or micromachining on silicon wafers.

High aspect ratio microstructures have also been prepared using x-ray lithography with high quantum energy synchrotron radiation. The "LIGA" process (see Becker, et al., Microelectronic Engineering 4 (1986) 35–56, and U.S. Pat. No. 4,990,827) produces microstructures with lateral dimensions in the micrometer range and structural heights of several hundred micrometers. The LIGA process is schematically illustrated in FIG. 1. A polymeric material (resist) which changes its dissolution rate in a liquid solvent (developer) on high energy irradiation, is exposed through an x-ray mask to highly intense parallel x-rays. The radiation source is an electron synchrotron or an electron storage ring that can generate the highly collimated photon flux in the spectral range required for precise deep-etch x-ray lithography in thick resist layers. As an example, a pattern thickness between 10 and 1,000 μm typically requires an optimal critical wavelength of synchrotron radiation of from 0.1 and 1 nm. In the next step, the resist structure is used as a template in an electroforming process in which metal is deposited onto the electrically conductive substrate (galvanoformation). The polymeric resist is then removed to provide a highly precise metal mold. The secondary plastic mold is prepared by introducing a polymeric mold material into the metal mold cavities through the holes of a gate plate. The plate has a formlocking connection with the polymeric microstructure, and after hardening of the molding resin the plate serves as an electrode in a second electroforming process for generating secondary metallic microstructures. The LIGA process produces highly precise secondary structures, including those with an aspect ratio of up to 100 and minimum lateral dimensions in the micrometer range.

The LIGA process has been used to produce microsensors, measuring devices for vibration and acceleration, microoptical devices and symmetry, fluidic devices, and electrical and optical microconnectors. Primary disadvantages associated with the LIGA process are that it can only produce fully attached metal structures, and that the process requires the use of an electron syncrotron, that is not readily available.

Guckel et. al. (Proceedings of International Conference on Solid-State Sensors and Actuators, 1991) reported a new process called sacrificial LIGA (SL1GA). The process is illustrated in FIG. 2. The addition of a sacrificial layer to the LIGA process facilitates the fabrication of fully attached, partially attached or completely free metal structures. Because device thicknesses are typically larger than 10 µm and smaller than 300 µm, freestanding structures do not distort geometrically if reasonable strain control of the plated film is achieved. However, the process still requires the use of an electron syncrotron, that is not readily available. It would be useful to provide a process and apparatus for the production of high aspect ratio micro and ministructures for microelectronics that do not require the use of an electron syncrotron.

Therefore, it is an object of the present invention to provide a method for the preparation of objects by 3D-stereolithography that minimizes object distortion.

It is an additional object of the present invention to broaden the selection of polymer precursors to include slow-reacting systems and to include particle-containing fluids that upon solidification form real parts that possess dual polymer and ceramic properties and/or magnetic, electrical, or optical attributes.

It is yet another object of the present invention to accomplish precision polymerization within a short time, so that real parts can be generated quickly.

It is still another object of the present invention to provide a process and apparatus for the production of high aspect ratio micro and ministructures for microelectronics.

SUMMARY OF THE INVENTION

Methods and apparatus are disclosed for the production of high precision large scale, micro and mini structures using three dimensional stereolithography. The objects formed using these methods have minimal stress between layers and low curl distortion. The objects also have low warpage because no post-cure treatment is necessary.

In one embodiment, structures are prepared using three-dimensional stereolithography under elevated pressure. The use of elevated pressure allows the use of elevated temperatures and/or viscous polymeric precursors in the reaction vat. The imposed pressure in the vat allows the formation of real objects (as opposed to prototypes) that include inert polymeric or nonpolymeric materials, including magnetic particles, dielectric particles, ceramic particles, liquid crystals, liquid crystal polymers, noncentrosymmetric moieties for nonlinear optics, conductive particles, and conducting polymers, in the solid. The magnetic particles, liquid crystals, liquid crystal polymers, and noncentrosymmetric moieties can be suitably aligned on the imposition of a magnetic or electric field.

In a second embodiment, methods and apparatus are disclosed for the production of high precision large scale, micro and mini structures using three dimensional stereolithography under elevated temperature above ambient temperature. Elevated temperatures lower fluid viscosity so that the polymer precursor fluid flows easily. Elevated temperature can be used in an open or closed vat. When the polymer precursor fluid is heated in a closed vat, an internal vat pressure can be created (depending on the relevant vapor pressure of the precursor fluid) that enhances the precision of the process.

In another embodiment, an improvement in the process of three dimensional stereolithography is provided wherein stress related distortions in the polymeric material are minimized by causing the polymer precursor fluid to polymerize in a differential fashion along a moving front, so that the material ahead of the moving polymer zone remains liquid, and the material that the front has passed is solidified. In a typical method, the moving front is a slit through which UV light is transmitted. In another method, the moving front is the radial opening of an iris diaphragm. The still-liquid material ahead of the moving polymer zone can then flow freely, at a rate that equals the rate of shrinkage, and a distortion-free, reduced stress polymeric network is produced. Using this process, objects can be cast in a way to prevent cavitation, or voids caused by the shrinkage of material during polymerization. This method is referred to below as the "sequential polymerization" modification of the three dimensional stereolithographic process.

The sequential polymerization modification of the three dimensional stereolithographic process can be performed at ambient pressure, or at elevated pressure or temperature, or at elevated temperature and pressure.

A biphasic vat solution can be used that includes an inert immiscible fluid below the polymer precursor fluid. In another embodiment, a multi-phasic system is used, wherein the upper space is a gaseous phase (or light fluid that is UV-transparent but immiscible with the polymer precursor fluid). The use of gas (inert or reactive) or an intervening fluid layer between the transparent window and the reactive mixture prevents the sticking of the drawn layer to the window. The inert fluid also prevents the polymer precursor fluid from adversely affecting the means for imposition of pressure.

Mini and microstructures for microelectronics can be prepared using the methods disclosed herein that exhibit the precision of structures prepared using the LIGA or SLIGA techniques. For example, as illustrated in FIGS. 3–5, polymer precursor fluid is sequentially irradiated by a sequentially moving slit system (SMSS) or a computerized iris diaphragm (CID) in a pattern created by a photomask under optional elevated pressure or temperature. After formation of the desired polymeric patterned layer, an actuator mechanism raises the layer (which is attached to an elevator platform) by a differential amount, allowing fresh polymer precursor fluid to cover the layer. The fresh polymer precursor fluid is then polymerized on top of the prior formed layer in a desired patterned. This process is successively repeated until the desired three dimensional structure is built. After the high precision plastic mold is completed, it is removed from the vat and electroplated, typically with nickel. The plastic mold is then removed and free metal structure is cast.

BRIEF DESCRIPTION OF THE FIGURES

FIG. 9b includes a top view of the apparatus illustrated in FIG. 9a, with additional valve ports for the introduction and removal of desired materials, and FIG. 9c is a side view of the apparatus that illustrates a wiper mechanism.

FIG. 13 is a schematic illustration of an apparatus for efficient release of an object formed by three dimensional stereolithography from the transparent plate to which it becomes attached. The transparent plate is etched, and the etched depressions filled with a soft material that has a refractive index that matches the transparent plate. A tape is positioned over the glass plate in such a manner that the adhesive side of the tape is attached to the transparent plate and the nonadhesive side of the tape interfaces with the polymer precursor fluid and the object prepared from it.

DETAILED DESCRIPTION OF THE INVENTION

Figure 1:
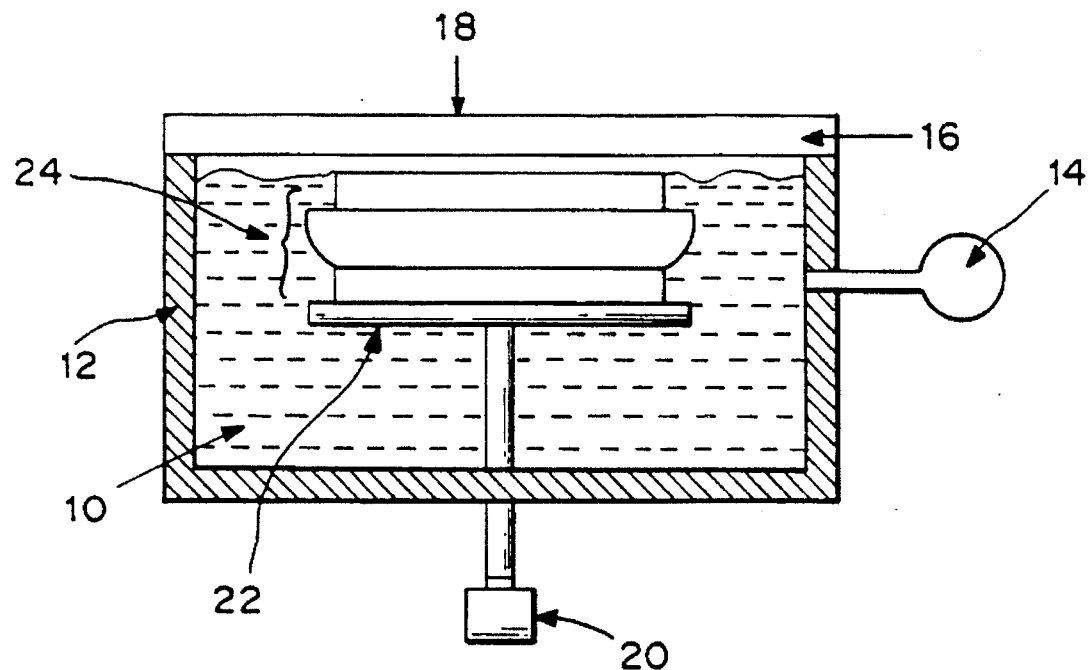
FIG. 1 is a cross sectional illustration of an apparatus for high pressure three-dimensional stereolithography.

The term ministructure, as used herein, refers to a structure that is typically greater than approximately 10 microns in height and less than approximately $10^3$ microns.

The term microstructure, as used herein, refers to a structure that is typically less than approximately 10 microns in height.

The term large scale structure refers to a structure that is greater than $10^3$ microns.

Methods and apparatus are disclosed for the production of high precision large scale, micro and mini structures using three dimensional stereolithography. The methods include the use of elevated pressure, elevated temperature, or sequential polymerization of polymer precursor fluid, or a combination of these, in the three dimensional stereolithographic process.

I. Preparation of Objects using Three Dimensional Stereolithography under Elevated Pressure, or Both Elevated Pressure and Elevated Temperature.

In one embodiment, a method and apparatus is disclosed for the preparation of objects with high precision using three-dimensional stereolithography under elevated pressure, or both elevated pressure and elevated temperature. Three-dimensional stereolithography under elevated pressure also optionally allows the use of viscous polymeric precursors in the reaction vat. The use of high temperature in the reaction vat causes rapid polymerization to close-to-completion stages during greenbody formation, resulting in greatly minimized shrinkage and dimensional alterations accompanying annealing. Since the high pressure process is inherently fast, it can force the reaction of partially polymerized starting materials, or other materials that do not polymerize as easily as acrylates or methacrylates. Thus, the greenbody can be prepared from a greater variety of chemicals, with high polymerization rates, and with the ability to crosslink during or after UV exposure at selected spots.

The use of high pressure in the reaction process also allows the production of objects that include nonpolymerized materials, such as filler, additives, colloidal particles, magnetic particles and inert polymers.

The process disclosed herein can be used to form complex three dimensional magnetic structures such as permanent-magnet structures for the production of transverse helical fields (IEEE Transactions on Magnetics, Vol Mag 22(5), Sep. 1986) and traveling wave tubes that have increased periodic magnetic fields (IEEE Transactions on Magnetics, Vol Mag 25(5), Sep. 1989).

Typical ethylenically unsaturated monomers that are used in the production of objects by three-dimensional stereolithography, such as acrylate and methacrylate esters, have a significant vapor pressure at ambient or near ambient temperature. The closed reaction vat disclosed herein prevents evaporation. The use of elevated pressure in the vat allows the polymerization reaction to be run at greatly elevated temperatures without inducing boiling or evaporation of the monomer or precursor. Photopolymerization proceeds at an increased rate at elevated temperatures. The high pressure minimizes the amount of shrinkage upon conversion of the monomer to polymer.

The method for improving the precision of parts made by 3D-stereolithography described herein using increased hydrostatic pressure, or optionally, increased temperature, is not limited to any one type of apparatus, but is instead a general technique. As discussed in the Background of the Invention, a number of apparatuses have been developed for rapid prototyping using the technique of three dimensional stereolithography. Equipment is sold by, among others, 3D Systems, Inc., Cubital America Inc., Quadrax Laser Technologies, Inc., Light Sculpting, Inc., and DTM Corporation. The distortion of objects made with any of these known methods and apparatuses for three-dimensional stereolithography can be improved by elevating the hydrostatic pressure. Systems that function by raising the resin level instead of lowering the model can be adapted for use with this process by employing a pressurized gas phase, or by draining or adding inert fluids and introducing the polymerizing fluid.

FIG. 1 is a cross sectional illustration of one example of an apparatus for high precision three-dimensional stereolithography. Polymer precursor fluid 10 is contained in the reaction vat 12. The reaction vat can have any shape, including four orthogonal sides, as in a rectangular box, or, alternatively, cylindrical. A vat with a cylindrical crosssection may be a preferred structure due to the high internal pressure. A means 14 for elevating the hydrostatic pressure in the vat is attached to the vat. Nonlimiting examples of means to elevate the pressure include, but are not limited to, a pump, a compressor, such as that used for HPLC or supercritical fluid extraction, a hydraulic pump or piston-cylinder arrangement. One side of the reaction vat 12 is a window 16 through which a polymeric initiating source 18 is transmitted. The initiating source 18, typically an ultraviolet radiation laser, writes a pattern in the layer of precursor fluid close to the top surface of the pool. The pattern is formed by the localized photopolymerization of the pool in selected regions indicated by the laser. Once a layer is finished, an actuator mechanism 20 lowers the imaged layer that sits on an elevator platform 22 by a differential amount, allowing fresh (unexposed) precursor fluid 10 to cover the underlying written layer. The process is then repeated and a new pattern is thus overlaid. Repeated usage of the laser in combination with platform lowering gradually builds up a complex 3-dimensional structure 24 wherein the final part is constructed of successive layers of rigidized images. The unreacted fluid 10 drains off the part (greenbody).

Heating can be accomplished by standard means, including but not limited to a jacketed vat, immersed coils, IR heating lamps, electrical cartridge heaters, wrapped heating tapes, microwave heaters, or by placing the vat in an oven.

Figure 2:
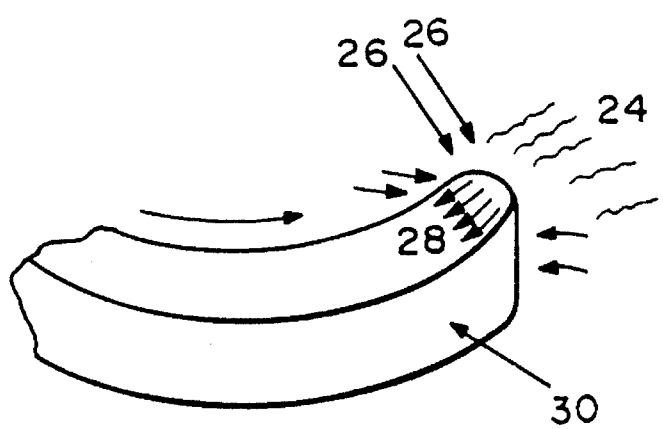
FIG. 2 is a magnified view of a local region of the monomer/precursor pool during irradiation, using three dimensional stereolithography.

Shrinkage of local polymerized regions in the object is minimized using this technique, because as the polymerization occurs, more polymer precursor fluid quickly enters the irradiated area, by virtue of the large hydrostatic pressure in the pool. The additional precursor fluid quickly polymerizes in the void space of the irradiated resulting from the shrinkage. This is illustrated in FIG. 2, which is a magnified view of a local region of the precursor fluid pool 24 being irradiated by an ultraviolet laser beam 26. The shrinkage 28 is compensated for by rapid influx of additional polymer precursor fluid 24 under high hydrostatic pressure. The resulting greenbody 30 does not suffer much shrinkage during annealing because it is already nearly fully polymerized (and in certain cases crosslinked).

High precision 3D-stereolithography minimizes curl distortion. Curl distortion is a complex phenomenon. It is primarily controlled by the rate of stress relaxation at the deposition temperature, and the total residual shrinkage after the newly-formed layer is anchored (attached) to the underlying layer. The use of high temperature ensures rapid polymerization, so that the new layer is nearly completely converted to polymer. Because of this, residual shrinkage is minimized. In addition, stress relaxation increases as temperature increases, and therefore can be reduced appropriately in the object by the careful choice of temperature during manufacture.

The extent of curing that occurs in the closed vat can be easily assessed by extracting the uncured material in the object with a suitable solvent, and then comparing the weight and size of the object before and after extraction. Methyl ethyl ketone is a common solvent used for this purpose.

Temperature

The temperature in the closed and pressurized vat can range from ambient temperature or below to any elevated temperature that can be accommodated by the vat and that does not adversely affect the quality of the object, or induce undesired side reactions. Any means known to those of ordinary skill in the art can be used to heat the reaction vat. The upper limit on the temperature used is also influenced by a number of factors, including: (1) the material of construction of the closed vat (as a nonlimiting example, an apparatus made from metal, stainless steel, or alloy, with quartz or sapphire in thick glass as the window can withstand several thousand pounds per square inch pressure and temperature); (2) volatility of the polymer precursor fluid (for example, by using a monomer/polymer mixture, the vapor pressure is lowered, and increased temperatures can be accomplished with less externally applied pressure); and (3) organic decomposition temperatures (oxidative degradation or depolymerization), which are typically relatively high (400° C. or over, with exceptions). Typical temperatures for the process described herein range from 30° to 300° C., and more typically, between approximately 40° or 50° to 150° C. It is preferred to maintain a uniform temperature throughout the vat to prevent natural convection. The optimal working temperature for any given system can be determined easily, by carrying out the process at a range of temperatures.

Superheated liquid can be used in this process. Care should be taken, however, to avoid oxidation and heat-induced polymerization.

Pressure

Any elevated pressure can be used in the closed vat that decreases the distortion or increases the general quality of the object under production. Pressures used in the vat can range from slightly above ambient pressure, for example, 50–100 psi, to 100,000 psi (pounds per square inch), and more typically, from 50 or 100 psi up to 10,000 psi. The increased pressure decreases the risk of float-away pieces and the need for webbing support, through the ability to use viscous starting materials, and the exploitation of density control with biphasic and multiphasic systems.

The pressure and temperature relationship governed by monomer boiling or evaporation (which provides the minimum pressure required at a fixed operating temperature) is governed by the well-known Antoine Equation, or in the simplified form, the Clasius-Clapeyron Equation. The pressure and temperature should be optimized for a given polymer precursor fluid by testing a range of each. For example, if the monomer is not very volatile, high pressure with slightly elevated temperature may be appropriate.

The transparent window must be attached to the container with an adhesive that will withstand the desired high temperature. Alternatively, O-rings, or other material that can withstand high pressure, can be used to attach the window.

Means for elevating pressure

There are many known means for increasing the hydrostatic pressure of a fluid in a vat. Any of these known means can be used in connection with this method. As an example, a simple pressure pump can be connected to the apparatus, as shown in FIG. 1. Other nonlimiting examples of means to elevate the pressure include, but are not limited to, a compressor, such as that used for HPLC or supercritical fluid extraction, a hydraulic pump and a piston-cylinder arrangement, or a compressed gas source.

Polymerization initiating source

Any polymeric initiating source that can travel through a window can be used with this method. A preferred initiating source is an ultraviolet radiation laser, or UV light from a mercury lamp. The typical wavelength used is between 300 and 400 nm. It is well known that UV lasers can be transmitted through UV transparent windows prepared from quartz, sapphire, or fused silica. Bk7 glass manufactured by Schott is also suitable as a UV transmitting window. Heat can also be used as a polymeric initiating source, according to methods and conditions well known to those of skill in the art.

Polymer Precursor Fluid

Fast curing monomers such as acrylate or methacrylate esters are optimal materials for use as the polymer precursor fluid. The acrylates or methacrylates can be monomeric, oligomeric or polymeric, or a mixture thereof. The higher the percentage of acrylate component, the faster the cure in general. A number of polymer precursor fluids are known and commercially available for use in 3D-stereolithography. For example, Ciba Geigy Corporation sells an acrylate based fluid that is used in the apparatus sold by 3D Systems, Inc. DeSoto Chemicals, Inc. also sells an acrylate based material, useful in the apparatus sold by Quadrax Laser Technologies, Inc. Somos 2100 photopolymer, sold by the Du Pont/Somos Venture, is a precursor fluid that contains acrylates as a minor component. Another suitable material is Potting Compound 363, a modified acrylate sold by Locktite Corporation. UV curable resins are also taught in U.S. Pat. No. 4,100,141, and 4,942,001. Other UV-curable coatings, varnishes, and adhesives are well known to those skilled in the art.

Prior art 3D-stereolithographic systems have required the use of a low viscosity polymer precursor fluid (such as that of free methacrylate or acrylate monomer) to allow fresh material to freely and quickly flow across the surface of the newly formed polymeric layer. Resulting low molecular weight dead polymer is left in the final part, causing long-term dimensional instability. The use of elevated pressures and temperatures allow the use of more viscous precursor fluids, preferably, that include component or are reacted to form materials with relatively high molecular weights. One example is thermosetting precursor fluid. Thermosetting networks are typically highly crosslinked. Examples include UV-curable epoxies, multifunctional acrylates, and polyunsaturated polymers. The use of thermosetting precursor fluid results in a green body with substantially decreased distortion, on the basis that the higher the existing degree of crosslinking at the moment of formation and deposition of the greenbody, the lower the residual distortion upon annealing.

Polymer precursor fluids should cure fast enough under the conditions of use that a solid or suitably semisolid layer is formed on initiation. The conditions of elevated pressure and, optionally, elevated temperature, used in the method described herein could allow for the use of precursor fluids that previously could not have been used due to unacceptably slow polymerization times, including styrenics and allyl-terminated monomers.

Acrylate-terminated or otherwise unsaturated urethanes, carbonates, and epoxies can also be used in the rigid framework. An example of an unsaturated carbonate is allyl diglycol carbonate (CR-39). Unsaturated epoxies that can be used include, but are not limited to, glycidyl acrylate, glycidyl methacrylate, allyl glycidyl ether, and 1,2-epoxy-3-allyl propane.

Other examples of monomers that can be used in the high pressure, high temperature 3D-stereolithographic vat are N-vinyl monomers, including N-vinyl pyrrolidine, bisphenol-A-bis-2-hydroxypropylmethacrylate, bisphenol-A-bis-2-hydroxypropylacrylate, bisphenol-A-ethoxy diacrylate, tri- or tetrafunctional acrylates or methacrylates, alkylene glycol and polyalkylene glycol diacrylates and methacrylates, including ethylene glycol dimethacrylate and ethylene glycol diacrylate, propoxylated neopentyl glycol diacrylate, vinyl or allyl acrylates or methacrylates, divinylbenzene, diallyldiglycol dicarbonate, diallyl maleate, diallyl fumarate, diallyl itaconate, vinyl esters such as divinyl oxalate, divinyl malonate, diallyl succinate, triallyl isocyanurate, the dimethacrylates or diacrylates of bis-phenol A or ethoxylated bis-phenol A, methylene or polymethylene bisacrylamide or bismethacrylamide, including hexamethylene bisacrylamide or hexamethylene bismethacrylamide, di(alkene) tertiary amines, trimethylol propane triacrylate, pentaerythritol tetraacrylate, divinyl ether, divinyl sulfone, diallyl phthalate, triallyl melamine, 2-isocyanatoethyl methacrylate, 2-isocyanatoethylacrylate, 3-isocyanatopropylacrylate, 1-methyl-2-isocyanatoethyl methacrylate, and 1,1-dimethyl-2-isocyanaotoethyl acrylate. Perfluorinated and semifluorinated derivatives of the above-listed compounds are also suitable. The fluorinated monomers or polymers can be used, for example, in the preparation of non-sticking parts.

Preformed polymers that have ethylenically unsaturated groups can also be used in the precursor polymer fluid, including acrylate-terminated novolacs, and polyurethanes, polymeric epoxies, and polycarbonates that have been derivatized to include acrylate, methacrylate, or other unsaturated functional groups. These types of polymers are well known and commercially available. Examples of commercially available photocurable materials are the line of Synocure products sold by Cray Valley Products (for example, Synocure 3101, a diacrylate derivative of bisphenol-A, and Synocure 3134, an aliphatic urethane diacrylate), and the Epon products sold by Shell Corporation (for example, Epon 1001 and Epon 828, which are both diacrylates of the diglycidyl ether of bisphenol-A). Vinyl-terminated liquid crystalline polymers can also be used.

In an alternative embodiment, inert polymers can be added to the starting mixture, to thicken the mixture, for ease of handling, to reduce the total reaction time, or for other reasons. The typical range of inert material is in the range of 1% to 90% by weight of the polymer precursor fluid. The inert polymeric material can be any polymer, and can be used in any amount, that does not adversely affect the desired properties of the final material. Inert polymers in general are polymers that do not react with other components in the reaction solution. In one embodiment, an inert polymer of the monomer present in the polymer precursor fluid is added to the fluid. For example, if methyl methacrylate is in the polymer precursor fluid, polymethylmethacrylate can be added to the solution.

In one embodiment, inert polymer is included in the polymer precursor fluid in the form of a latex or dispersion. The latex can optionally be a composite or multi-phase material, composed, for example, of a core-shell structure.

The inert polymer can contribute a beneficial property to the solidified object. For example, a latex of rubbery particles, including but not limited to poly(styrene-butadiene) rubber, can be added to improve the impact resistance of an object formed from hard monomers. Conversely, when the polymer precursor fluid is comprised of soft monomers, a dispersion of hard particles, such as poly(styrene) or poly(methyl methacrylate), can be added to increase the strength of the object. Latexes or dispersions with any desired average particle size, typically from 100 nm to 10 µM, can be included in the fluid. The optimal average particle size and average particle size distribution will depend on the specific system and the desired property modifications. Impact resistance is usually enhanced most efficiently with particles of average particle size less than one micron.

Nonpolymeric fillers can also be added to the polymer precursor fluid, including but not limited to carbonates, such as $CaCO_3$ and $MgCO_3$, clay, including attapulgite clay, borates, sulfates, phosphates, diatomaceous earth such as celite and silica flour, alumina, colloidal silica, and zeolite solids. Filler can be added up to the volume fraction at which the mixture stops flowing no matter what pressure is applied. Typically, there is a 64% theoretical monodisperse sphere packing maximum.

Colloidal particles suspended by Brownian motion can be used, including colloidal gold, titanium oxide, ferric oxides (magnetic), cobalt, molybdenum oxide, vanadium oxide, nickel, alloys, transition metal-rare earth complexes, silicon dioxide, silicon nitride, germanium oxide, silicon atom clusters, gallium arsenide, and other semiconducting particles.

Other inorganic particles, such as sulfides and chlorides can also be used. Organic particles can be crosslinked beads (as small as colloids or as large as micron sized spheres). Since most organic materials are of comparable density, large organic particles can easily be dispersed throughout the fluid without settling.

Inclusion of Magnetic Particles

In an alternative embodiment, magnetic particles can be included in the polymer precursor solution. Nonlimiting examples include the magnetic particles mentioned above, including ferric oxide and transition metal/rare earth compounds in small particle form. During laser irradiation, the N-S pole can be aligned, and the resin then hardened, in such a way that tiny magnetized regions are formed, for example, tiny motors, actuators, and sensors. Complex keys and locks can be formed using this procedure. A lock reads the code by induced currents in coils. After one turn of the key, the embedded information is read.

It is possible to produce fine actuation by controlling an electric field through a coil that is attached to a rod prepared by 3D-stereolithography using magnetic particles in the polymer precursor fluid. A rod with complex information embedded in it by virtue of the placement of hardened tiny magnets in the resin is first prepared using the method described herein. The rod is then connected to a variable voltage source. Each time the coil current changes, the rod moves in a controlled fashion.

Liquid crystal molecules (for example, ferroelectrics, cholesterics, nematics (nematogens), smetics, etc.) liquid crystal like molecules or aggregates can be aligned and trapped in resin for display or light piping applications.

Nonlinear optically active compounds such as noncentrosymmetric molecules or block polymers, graft polymers, or copolymers can be frozen in a controlled way 3-dimensionally, allowing very complex integrated optics to be prepared, with horizontal as well as vertical light-piping and light modulation capabilities.

Figure 3:
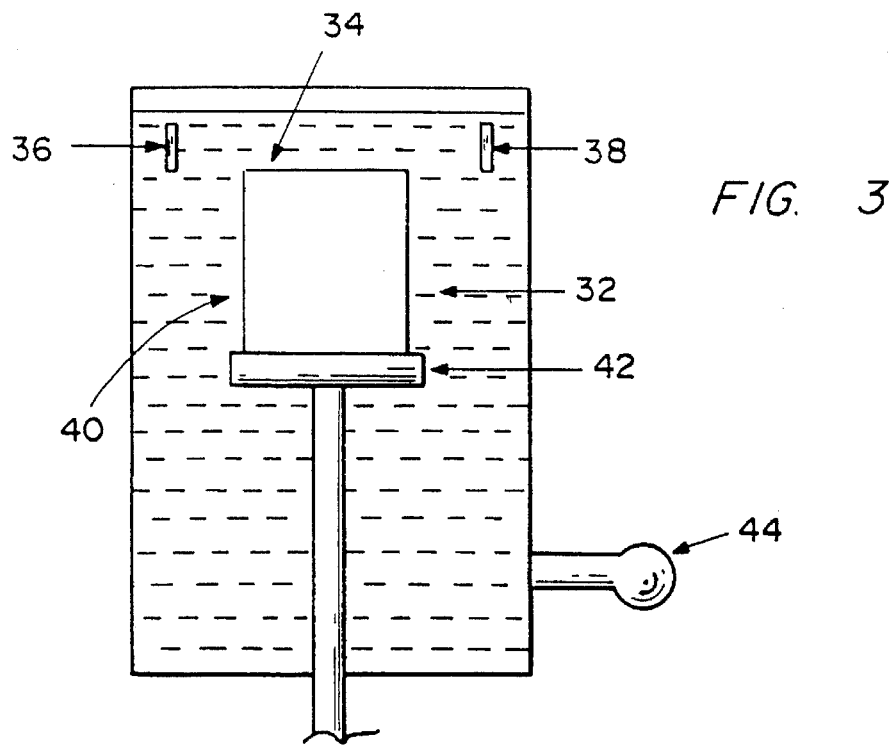
FIG. 3 is a cross sectional illustration of an apparatus for high pressure three-dimensional stereolithography that includes a means for imposition of electric or magnetic fields to align magnetic particles dispersed in the polymeric precursor fluid.

FIG. 3 is an illustration of one apparatus for high pressure three-dimensional stereolithography that includes a means for imposition of electric or magnetic fields to align magnetic particles dispersed in the polymeric precursor fluid. Polymer precursor fluid 32 that contains magnetic particles or ferroelectric liquid crystals is irradiated with an ultraviolet laser beam 34 between electrodes or magnets 36 and 38 to provide an object 40 that sits on platform 42. Hydrostatic pressure is imposed by means of pump 44, and elevated temperature is provided by heating means 46. The upper limit of the electric field is the breakdown strength of the fluid, typically in the range of 1 MV/cm. The upper limit of the magnetic field is the limit of the available electromagnet. Large electromagnets such as those used in nuclear magnetic resonance can provide a very strong magnetic field. The field can be pulsed in a controlled fashion or reversed as desired. It can also be crossed or rotated. The resulting object can have regions that are magnetized and regions that are not magnetized.

The electric or magnetic field can be imposed in a horizontal fashion as well as in a verticle fashion. In addition, the particles in the object can be aligned differently, depending on when the field is turned on or off or reversed. As clear from the description herein, since high pressure three-dimensional stereolithography can accommodate the inclusion of filler, additives, or magnetic particles in the object, this technique can be used to produce real parts, not just models or prototypes. In addition, it can produce parts that serve active functions, such as motion control and light guiding.

Biphasic or Multiphasic Vat Fluid

Figure 4:
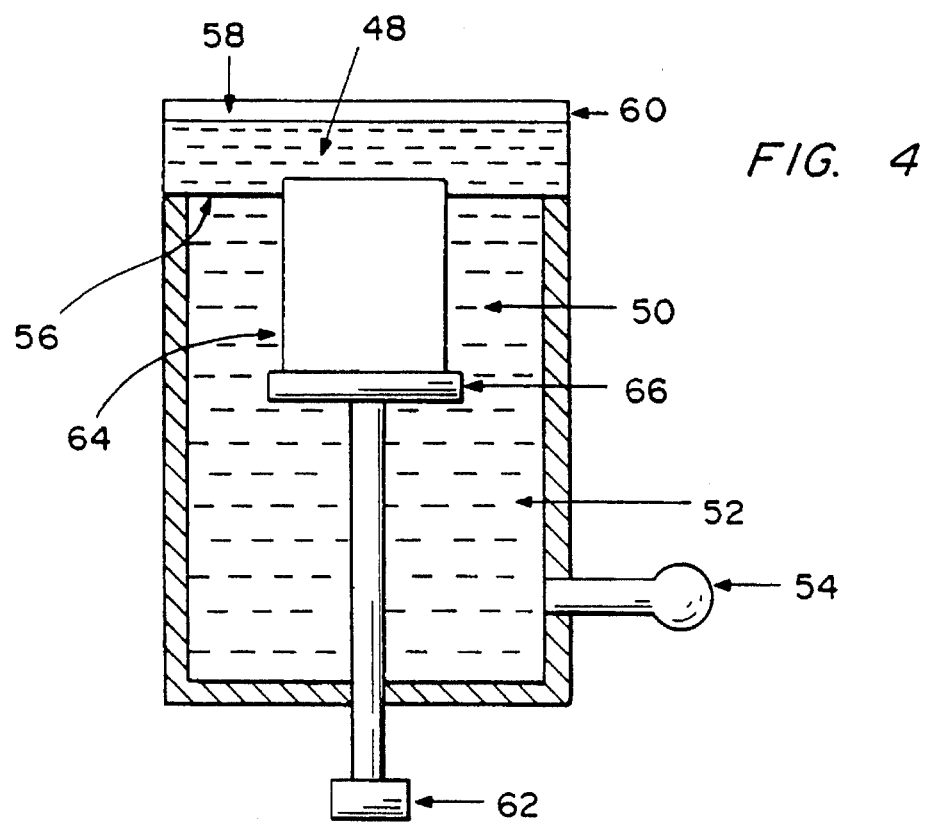
FIG. 4 is a cross sectional illustration of an apparatus for high pressure three-dimensional stereolithography that includes a biphasic vat fluid, and wherein the lower fluid is inert, and the upper fluid is a polymer precursor fluid.
Figure 5:
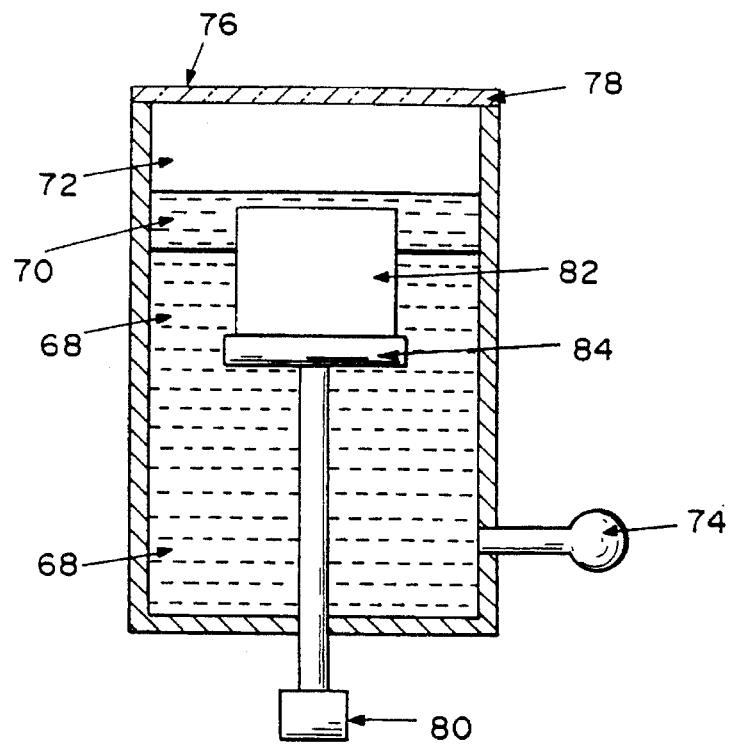
FIG. 5 is a cross sectional illustration of an apparatus for high pressure three-dimensional stereolithography that includes a triphasic vat fluid, that includes a lower fluid that is inert, a next layer of polymer precursor fluid, and an upper gaseous or light fluid phase that is UV-transparent but immiscible with the polymer precursor fluid.

In another alternative embodiment, an immiscible fluid (inert fluid) can be used in the high pressure vat to conserve polymer precursor fluid and to function as hydraulic fluid for system pressurization. The inert material is typically at the bottom of the vat, as illustrated in FIGS. 4 and 5.

Figure 6:
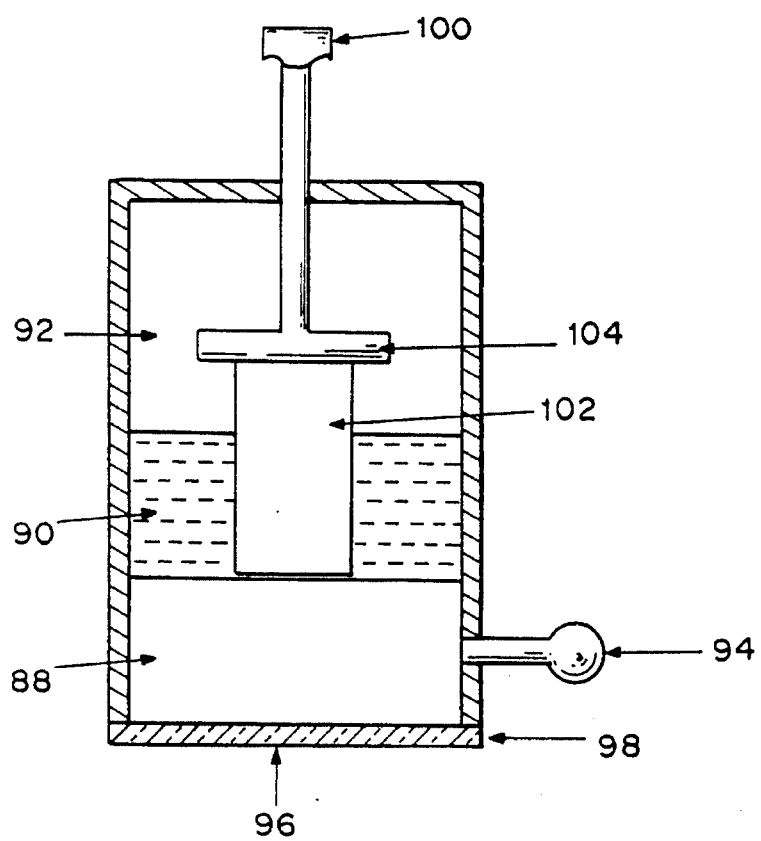
FIG. 6 is a cross sectional illustration of an apparatus for high pressure three-dimensional stereolithography that includes a triphasic vat fluid, that includes a lower hydraulic fluid that is inert and UV-transparent, a next layer of polymer precursor fluid, and an upper gaseous or light fluid phase that is immiscible with the polymer precursor fluid, and wherein the part is pulled up out of the polymer precursor fluid.
Figure 7A:
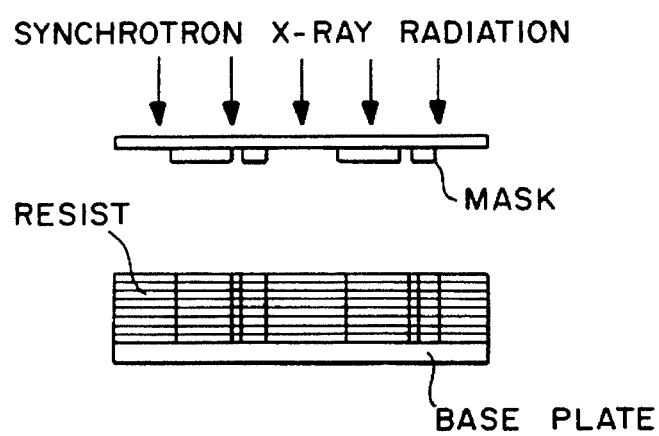
FIG. 7 is a cross-sectional illustration of a method to prepare micro- and ministructures using LIGA technology.
Figure 7B:
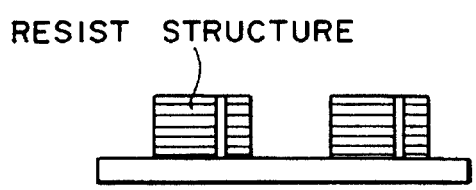
Figure 7C:
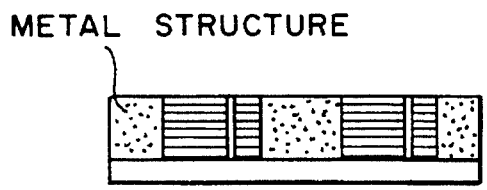
Figure 7D:
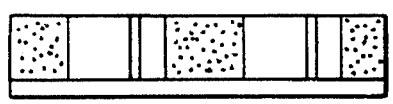
Figure 7E:
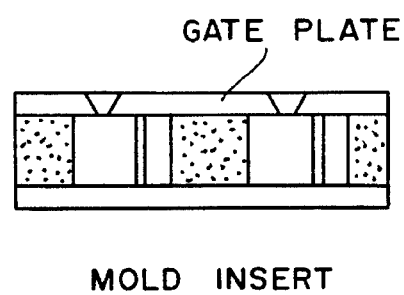
Figure 7F:
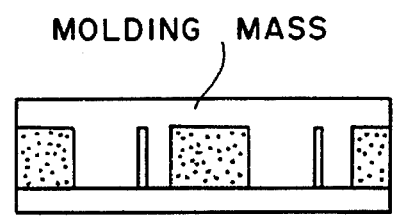
Figure 7G:
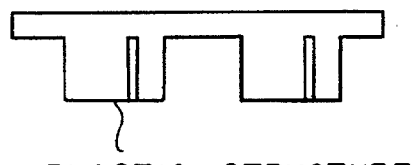
Figure 8A:
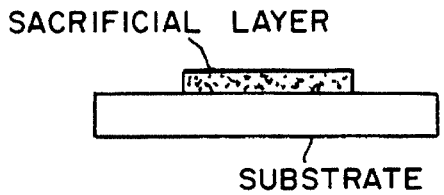
FIG. 8 is a cross-sectional illustration of a method to prepare micro- and ministructures using SLIGA technology.
Figure 8B:
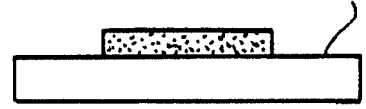
Figure 8C:
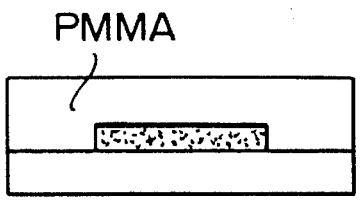
Figure 8D:
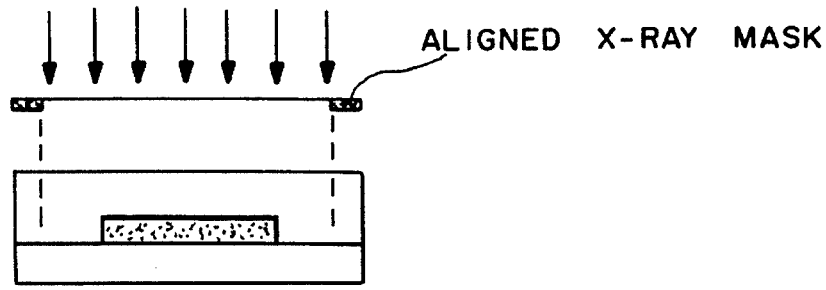
Figure 8E:
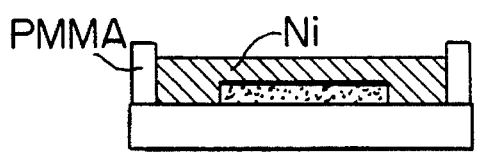
Figure 8F:
Figure 8G:
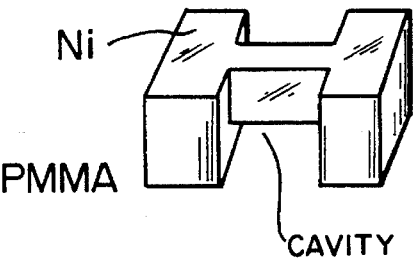

The inert material should be immiscible with the UV curable material, and have an intermediate density between the uncured and cured UV-curable material. Upon curing, the cured fluid (now a polymer), becomes heavier (denser) than the inert material. Since the laser is typically focused through a quartz or sapphire window on top of the closed and pressurized vessel, the inert material does not have to be UV transparent. A membrane separating the two fluids, such as that disclosed in U.S. Pat. No. 5,011,635, is not necessary in this system. If the inert material is transparent, the UV irradiation can shine up from the bottom of the vat, as illustrated in FIG. 6.

Silicones and fluoromers (fluorocarbons or fluorocarbon liquids) are ideal candidates for the inert fluid. The density of these materials is greater than monomers or precursors of polymers, but lower than dead polymer (finished polymers). The buoyancy effect experienced by the part as it descends into the inert fluid keeps it from deforming (sagging) under gravity. Nonlimiting examples are perfluorinated alkanes and PFA. Fluorofluids are sold by E. I. Du Pont de Nemours and Company and Minnesota Mining and Manufacturing Company. Silicone fluids include polydimethylsiloxane oligomers, and aromatic and aliphatic siloxanes. Huls Corporation manufactures a complete line of silicone fluids.

The inert fluid can also be water, glycerol, glycol, alcohol or fluorinated derivatives of these liquids.

The inert fluid serves at least three additional important functions: it scrubs the greenbody of excess material (unpolymerized material clinging to the greenbody), it transmits the high imposed pressure, and it physically separates the pump from the polymer precursor fluid. Since the vat may be under elevated pressure due to a duct work attached to the vessel, the duct can be physically separated from the polymer precursor material, preventing clogging. If UV-curable fluid is in the pump duct, even stray light may trigger enough undesirable polymerization to clog the opening.

FIG. 4 is a cross sectional illustration of one type of apparatus for high pressure three-dimensional stereolithography that includes a biphasic vat fluid. Polymer precursor fluid 48 floats above the inert fluid 50 in the pressurized reaction vat 52. A means 54 for elevating the hydrostatic pressure in the vat, typically a pump, is attached to the vat below the interface of the two fluids 56. The polymer initiating source 58 is transmitted through a window 60. The initiating source 58, typically an ultraviolet radiation laser, writes a pattern in the layer of precursor fluid close to the top surface of the pool. Once a layer is finished, an actuator mechanism 62 lowers the imaged polymerized layer (which now has a density that is higher than the inert fluid) into the inert fluid 50. Fresh (unexposed) precursor fluid 52 is then floated on top of the imaged layer at the interface of the two fluids. The process is then repeated and a new pattern is thus overlaid. Repeated usage of the laser in combination with platform lowering gradually builds up a complex 3-dimensional structure 64 on platform 66 wherein the final part is constructed of successive layers of rigidized images, and is submerged in the inert fluid 50. The inert fluid 50 scrubs the unreacted fluid 48 drains off the part (greenbody). In FIGS. 1–6, polymer precursor fluid, inert fluid and gas or light fluid are added and removed as desired through appropriately placed ducts in the apparatus, not illustrated.

FIG. 5 is a cross sectional illustration of an apparatus for high pressure three-dimensional stereolithography that includes a triphasic vat fluid, that includes a lower fluid that is inert, a next layer of polymer precursor fluid 70, and an upper gaseous or light fluid phase 72 that is UV-transparent but immiscible with the polymer precursor fluid. A means 74 for elevating the hydrostatic pressure in the vat, typically a pump, is attached to the vat below the polymer precursor fluid 70. The polymer initiating source 76 is transmitted through a window 78. The initiating source 76, typically an ultraviolet radiation laser, writes a pattern in the layer of precursor fluid close to the top surface of the pool. Once a layer is finished, an actuator mechanism 80 lowers the imaged polymerized layer (which now has a density that is higher than the inert fluid) into the inert fluid 68. Fresh (unexposed) precursor fluid 70 is then floated on top of the imaged layer at the interface of the two fluids. The process is then repeated and a new pattern is thus overlaid. Repeated usage of the laser in combination with platform lowering gradually builds up a complex 3-dimensional structure 82 on platform 84 wherein the final part is constructed of successive layers of rigidized images, and is submerged in the inert fluid 68. The inert fluid 68 scrubs the unreacted fluid 70 drains off the part (greenbody).

FIG. 6 is a cross sectional illustration of an apparatus for high pressure three-dimensional stereolithography that includes a triphasic vat fluid, that includes a lower hydraulic fluid 88 that is inert and UV-transparent, a next layer of polymer precursor fluid 90, and an upper gaseous or light fluid phase 92 that is immiscible with the polymer precursor fluid, and wherein the part is pulled up out of the polymer precursor fluid. A means 94 for elevating the hydrostatic pressure in the vat, typically a pump, is attached to the vat below the polymer precursor fluid 90. The polymer initiating source 96 is transmitted through a window 98. The initiating source 96, typically an ultraviolet radiation laser, writes a pattern in the layer of precursor fluid close to the bottom surface of the pool on platform 104. Once a layer is finished, an actuator mechanism 100 raises the imaged polymerized layer. Fresh (unexposed) precursor fluid 90 is then floated on top of the imaged layer at the interface of the two fluids. The process is then repeated and a new pattern is thus overlaid. Repeated usage of the laser in combination with platform raising gradually builds up a complex 3-dimensional structure 102 on platform 104.

II. Preparation of Objects using Three Dimensional Stereolithography under Elevated Temperature In another embodiment, methods and apparatus are disclosed for the production of high precision large scale, micro and mini structures using three dimensional stereolithography under elevated temperature above ambient temperature. The parameters and reaction conditions described in Section I. apply to the method disclosed in Section II., including when performed under ambient pressure.

Elevated temperatures lower fluid viscosity so that the polymer precursor fluid flows easily. Elevated temperature can be used in an open or closed vat. When the polymer precursor fluid is heated in a closed vat, an internal vat pressure can be created (which depends on the relevant vapor pressure of the precursor fluid) that enhances the precision of the process. If the polymer precursor fluid has a high vapor pressure, a significant increase in vat pressure can be accomplished by increasing the temperature of the vat to approximately equal to or above that of the boiling point of the fluid. If the polymer precursor fluid has a low vapor pressure, elevated temperature can be used to increase the pressure in the vat by completely or almost completely filling the vat with the polymer precursor liquid. The increase in temperature causes a significant rise in pressure due to the thermal expansion of the liquid.

Any appropriate means can be used to elevate the temperature in the vat. A preferred means is a full jacket heater, such as that sold by Thermofoil Heater Products, Inc., Minneapolis, Minn.

Figure 17:
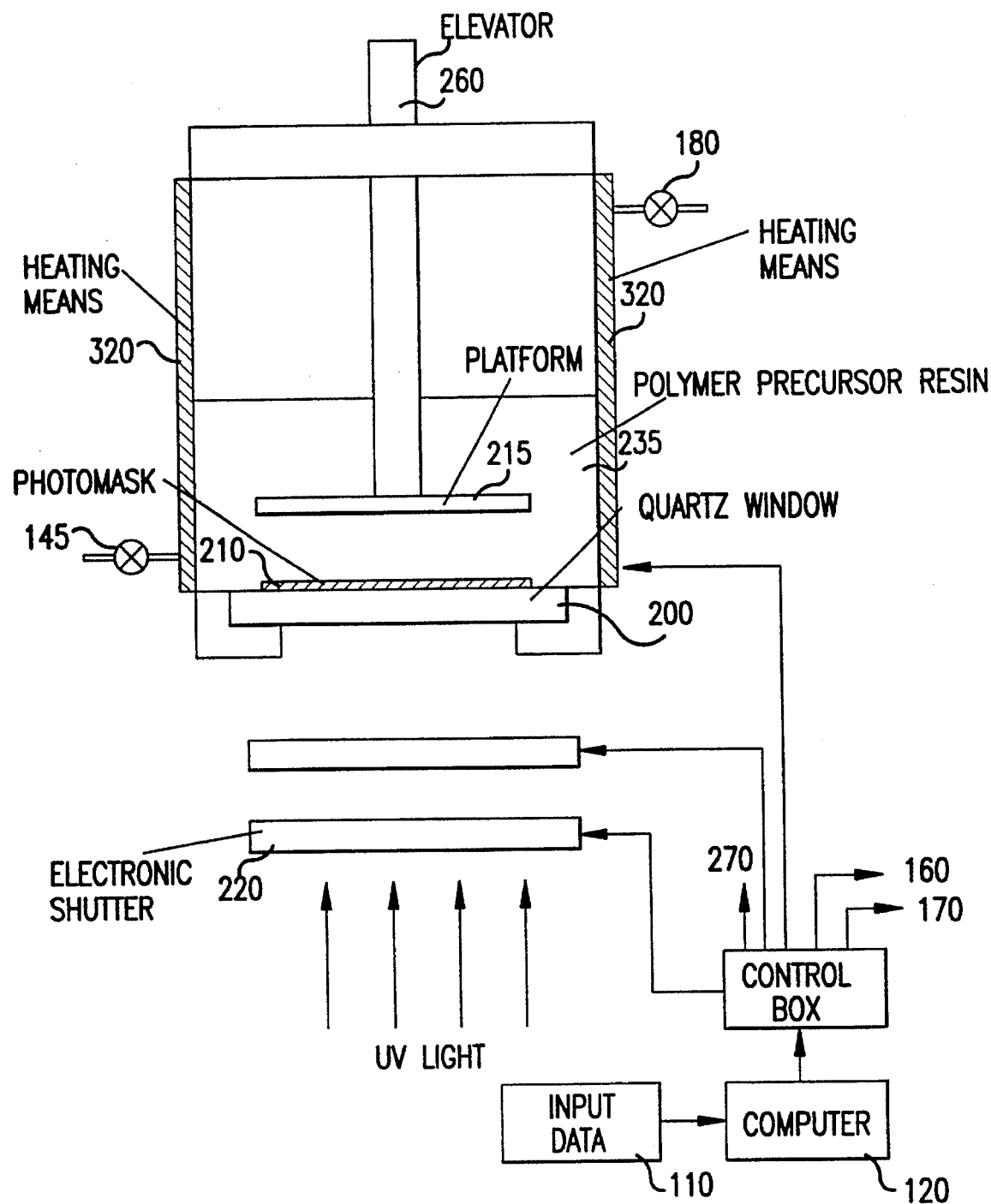
FIG. 17 is a cross-sectional schematic illustration of an apparatus for the production of a three-dimensional object that includes a means for elevating the temperature in the vat.

FIG. 17 is a cross-sectional schematic illustration of one embodiment of an apparatus for the production of a three-dimensional object that includes a means for elevating the temperature in the vat. As illustrated, heating means 320 is interfaced with control box 130 that receives heating instructions from computer 120. In a typical process, the reaction vat filled to the appropriate level with polymer precursor fluid is stabilized at the desired temperature, and the stereolithographic process then initiated.

As described in Section I, the temperature in the vat can range from ambient temperature or below to any elevated temperature that can be accommodated by the vat and that does not adversely affect the quality of the object, or induce undesired side reactions. In general, a temperature of between slightly above ambient temperature to approximately 300° C. is suitable, and more typically, between 40° or 50° C. and 150° C. A temperature should be selected that minimizes the distortion of the object to be formed, with the realization that as the object cools, it will typically undergo a degree of shrinkage. The shrinkage can cause stress in the object, resulting in a lack of accuracy, or precision. The degree of shrinkage is a function of a number of factors, including but not limited to the nature of the polymer precursor fluid, the extent of unpolymerized material in the object, the shape of the object, and whether pressure was used in the process. The optimal working temperature for any given system can be determined easily, by carrying out the process at a range of temperatures and conditions.

III. Preparation of Objects using Three Dimensional Stereolithography that includes the Sequential Polymerization of Polymer Precursor Fluid In an alternative embodiment, large scale, mini, and microstructures are prepared by three dimensional stereolithography in which the polymer precursor fluid is polymerized sequentially to reduce structure distortion caused by stress within and between layers. This method reduces curl distortion during the polymerization process. The sequential polymerization modification of the three dimensional stereolithographic process can be carried out at ambient temperature and pressure, or at elevated pressure, elevated temperature, or elevated pressure and temperature. The parameters and reaction conditions described in Section I. apply to the method disclosed in Section II., including when performed under ambient conditions.

Figure 12:
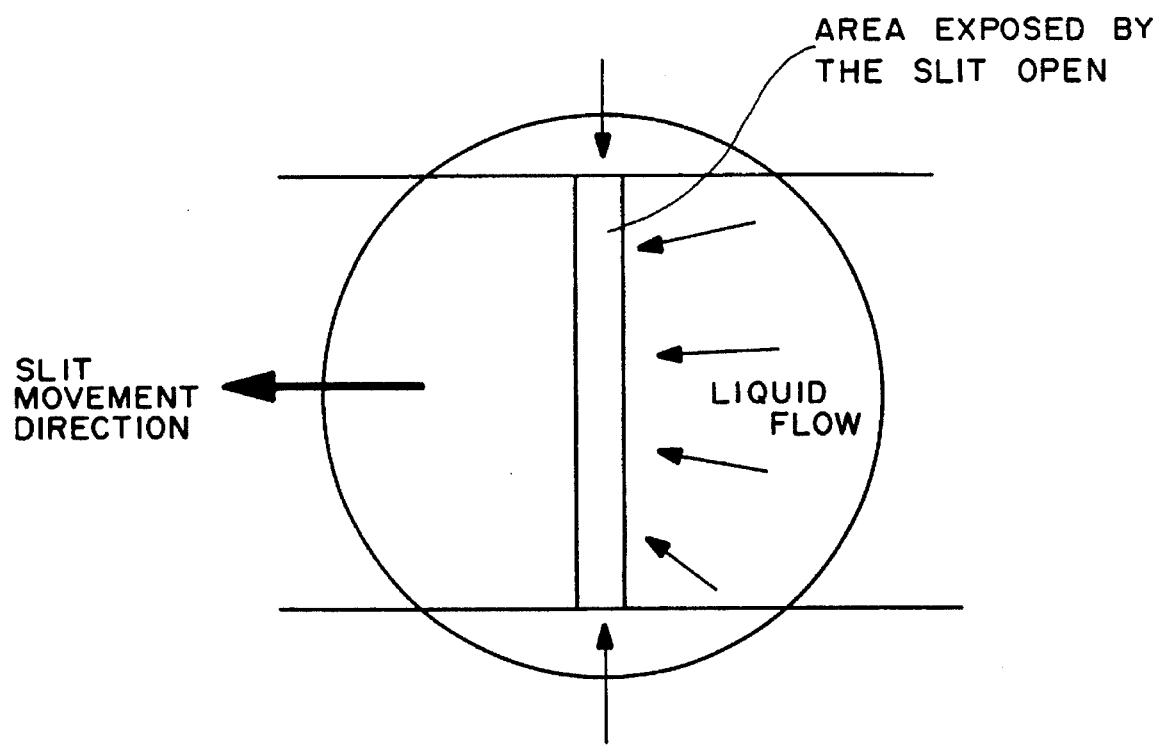
FIG. 12 is a magnified view of a local region of polymer precursor fluid on irradiation by UV light through a sequentially moving slit system.

The sequential polymerization technique is taught in general in U.S. Pat. Nos. 5,110,514 and 5,114,632 filed by David S. Soane. The sequential polymerization method minimizes stress and cavitation, or voids caused by the shrinkage of material during polymerization, that would otherwise cause locked-in stress and decrease replication fidelity. Stress in local polymerized regions of the object is minimized using this technique, because as the polymerization occurs sequentially within each layer, more polymer precursor fluid quickly enters the irradiated area to replenish the instantaneous volume lost to polymerization induced shrinkage. Even though the flow may be microscopic in quantity, the effect is profound, as intra and inter layer stress are minimized or eliminated. The additional polymer precursor fluid quickly polymerizes in the void space of the irradiated region resulting from shrinkage. This is illustrated in FIG. 12, which provides a magnified view of a local region of the precursor fluid pool being irradiated by a UV mercury lamp.

The sequential polymerization process is easily adapted to either radiation or thermal curing. Radiation curing is preferred because it is more controllable, and in general requires a shorter cure time. Radiation curing can be performed at moderately elevated temperatures to further reduce polymerization time.

A moving front of polymerization initiating source, typically UV irradiation, can be accomplished by use of any appropriate means. In one embodiment, a sequentially moving slit system (SMSS) is used, wherein a thin slit (typically between 1 μm and 10 mm) of irradiation sequentially passes over the polymer precursor fluid in such a manner that the material ahead of the moving polymer zone remains liquid, and the material that the front has passed is solidified. In another method, the moving front is the radial opening of an iris diaphragm. The still-liquid material ahead of the moving polymer zone flows freely, at a rate that equals the rate of shrinkage, and a distortion-free, reduced stress polymeric network is produced.

Figure 9A:
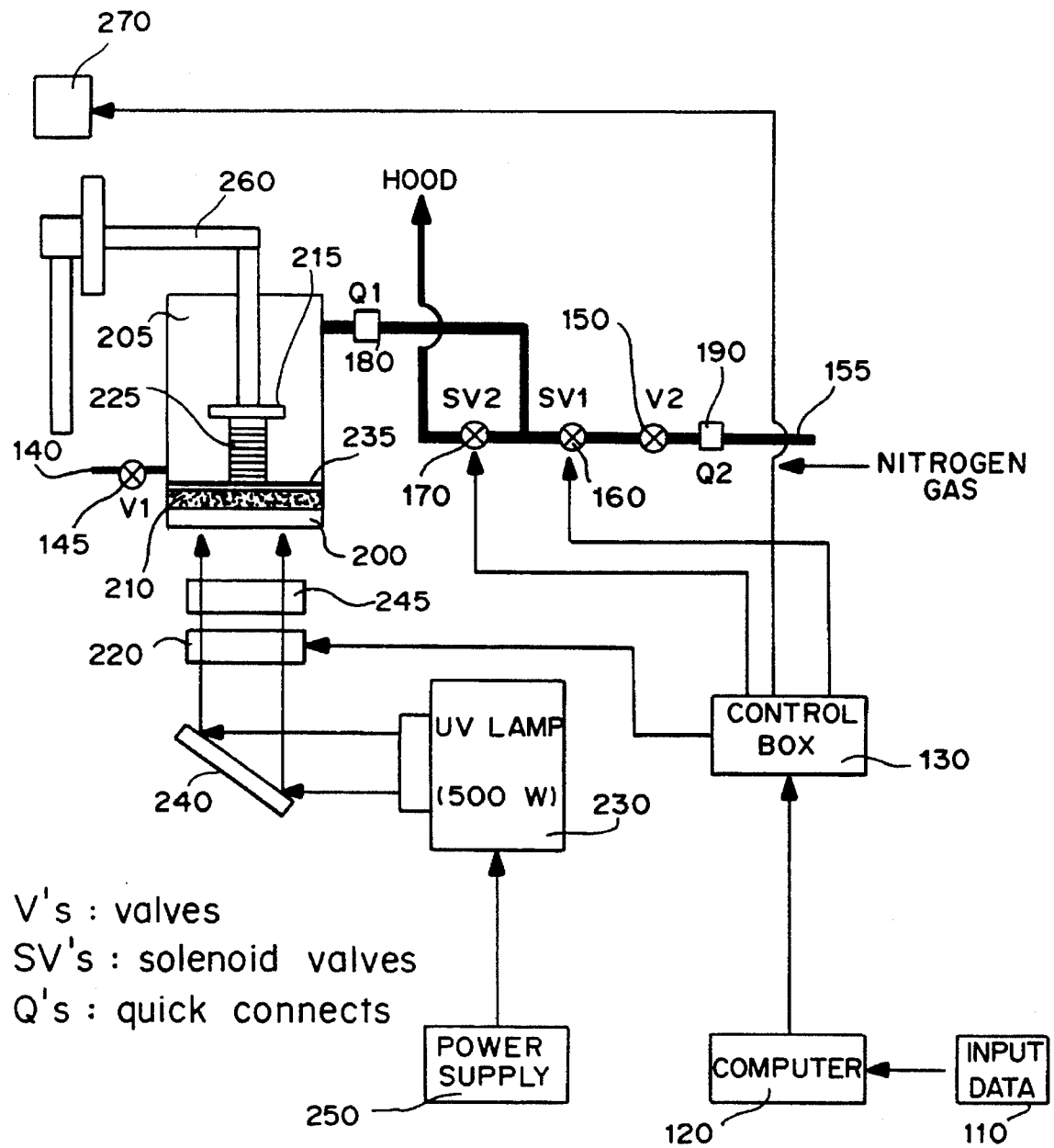
FIG. 9a is a cross-sectional illustration of an apparatus for the preparation of objects by three-dimensional stereolithography wherein the polymer precursor fluid is sequentially polymerized (V1 is a first valve, V2 is a second valve, SV1 is a first solenoid valve, SV2 is a second solenoid valve, and Q1 is a quick connect).

FIG. 9a is a schematic cross-sectional illustration of one apparatus for the preparation of objects by three-dimensional stereolithography wherein the polymer precursor fluid is sequentially polymerized (V1 is a first valve, V2 is a second valve, SV1 is a first solenoid valve, SV2 is a second solenoid valve, and Q1 and Q2 are quick connects). This example is not intended to limit the scope of the invention. Other apparatus designs can be easily constructed using the methods disclosed herein, and all of these are considered to fall within this invention.

As indicated in FIG. 9a, data 110 is fed into a computer 120 to establish a CAD file for the desired object, which is converted mathematically into stacked cross-sections, or layers. The computer 120 interfaces with control box 130 that controls the operation of solenoid valve 160, solenoid valve 170, a stepping motor 270, and an electronic shutter 220. Second solenoid valve 170 allows the release of pressure from the system as desired. Inert gas is fed through tube 155 (which has a quick connect joint 190, through valve 150 and solenoid valve 160, past quick connect 170 into reaction vat 205.

An elevator 260 controlled by stepping motor 270 is connected to platform 215. A thin layer of polymer precursor fluid 235 is introduced into the reaction vat 205 between platform 215 and UV transparent window 200 from tube 140 past valve 145. Valve 145 can be interfaced with computer 120 through control box 130 as desired.

Power supply 250 feeds the UV lamp 230. The power of the UV lamp typically ranges from hundreds to thousands of Watts. UV light from UV lamp 230 is reflected off mirror 240 through electronic shutter 220. The UV light is then passed sequentially through a photomask to the thin layer of polymer precursor fluid. The means for moving the light sequentially 245 is located at any appropriate place between the point at which the UV light is reflected off of the mirror, and the photomask 210. Two examples of means for sequential light movement, the sequentially moving slit system, and the iris diaphragm, are illustrated in detail in FIGS. 10 and 11.

The photomask is located at a point between the means for sequential light movement 245, and the polymer precursor fluid 235, and preferably, between the electronic shutter 220 and the transparent window 200. Any photomask system known to those skilled in the art can be used in this apparatus. As an example, U.S. Pat. Nos. 5,157,423 and 5,139,338 disclose a photomask system in which a CAD slice of an object is transferred from the computer to a mask generator, which operates like a photocopier: a negative image of the cross section is produced on a glass mask plate by charging portions of the surface and "developing" the electrostatic image with toner powder. In another embodiment, negative slice images are transmitted directly to the polymer surface using a flat array of backlighted liquid crystals under individual control. Alternatively, the use of a sequentially moving slit system allows the "dot matrix" type of programmable mask to be adopted. The photomask can be achieved by pixel reflectors actuated by piezoelectricity, as tiny deflections are sufficient to darken/lighten the intended spots. As the sequential polymerization progresses, the slit-like mask is synchronously altered by simultaneously switching on and off the in-line pixels.

In another embodiment, microbubble technology used in ink-jet printing is used to create the photomask. Microelectrodes can be positioned in a liquid filled cylinder, and light passed through the cylinder while the electrodes are heated. Upon transient heating, bubbles form at selected sites, and diffuse light travels through the cylindrical lens. The bubble spots correspond to dark, or unfocused pixels. The combination of dark and light spots forms the photomask image.

UV light is passed through the photomask 210 sequentially to create the appropriate light pattern on the thin polymer precursor layer to provide a polymeric layer of desired shape. Once the layer is finished, the elevator 260 moves the imaged layer that sits on elevator platform 215 by a differential amount, allowing fresh (unexposed) precursor fluid to cover the underlying written layer. The process is then successively repeated and new patterns overlaid, until a complex 3-dimensional structure is provided that is constructed of the successive layers of rigidized images. This system, which integrates the concepts of sequential polymerization with the three dimensional stereolithographic process, provides an object with minimal stress and dimensional distortion.

In this method, the polymer precursor fluid can be provided as a very thin layer, alone or over an inert immiscible layer. The method has the advantage of limiting layer thickness directly rather than relying solely upon UV damping due to absorption to limit the depth of curing. Ideally, an ultra thin laminae is provided. The ability to produce an ultra-thin laminae depends on the viscosity of the polymer precursor fluid and its tendency to spread out between the transparent window and the elevator platform. The use of elevated pressure and elevated temperature in the process lowers the viscosity of the polymeric precursor fluid, facilitating this process.

Using this method, objects can be prepared that include layers that vary in physical properties. As an example, the first several polymeric layers can be constructed of a soft, impact-resistant material, and successive layers formed from a hard thermoplastic material.

FIG. 9b is a top view of the apparatus illustrated in FIG. 9a, with additional valve ports for the introduction and removal of varying polymer precursor fluids, and a side view of the apparatus that illustrates a means for vacuum removal of the remaining polymer precursor fluid from the transparent plate. This apparatus embodiment can be used to prepare three dimensional objects from layers of differing polymer precursor fluids. As indicated, control box 130 signals the opening of the desired valve (V1 and V3 through Vn) to provide a layer of first polymer precursor fluid between the transparent plate and the platform. The IR sensor sends a signal to the control box to close the valve when a desired fluid thickness has been achieved. The platform is then lowered to the fluid surface, and the fluid cured in the desired pattern. The platform is then moved an appropriate distance, and the vacuum wiper transverses the transparent plate to remove residual fluid. These steps are then repeated with a second polymer precursor fluid, followed by other polymer precursor fluids, as required.

Figure 10:
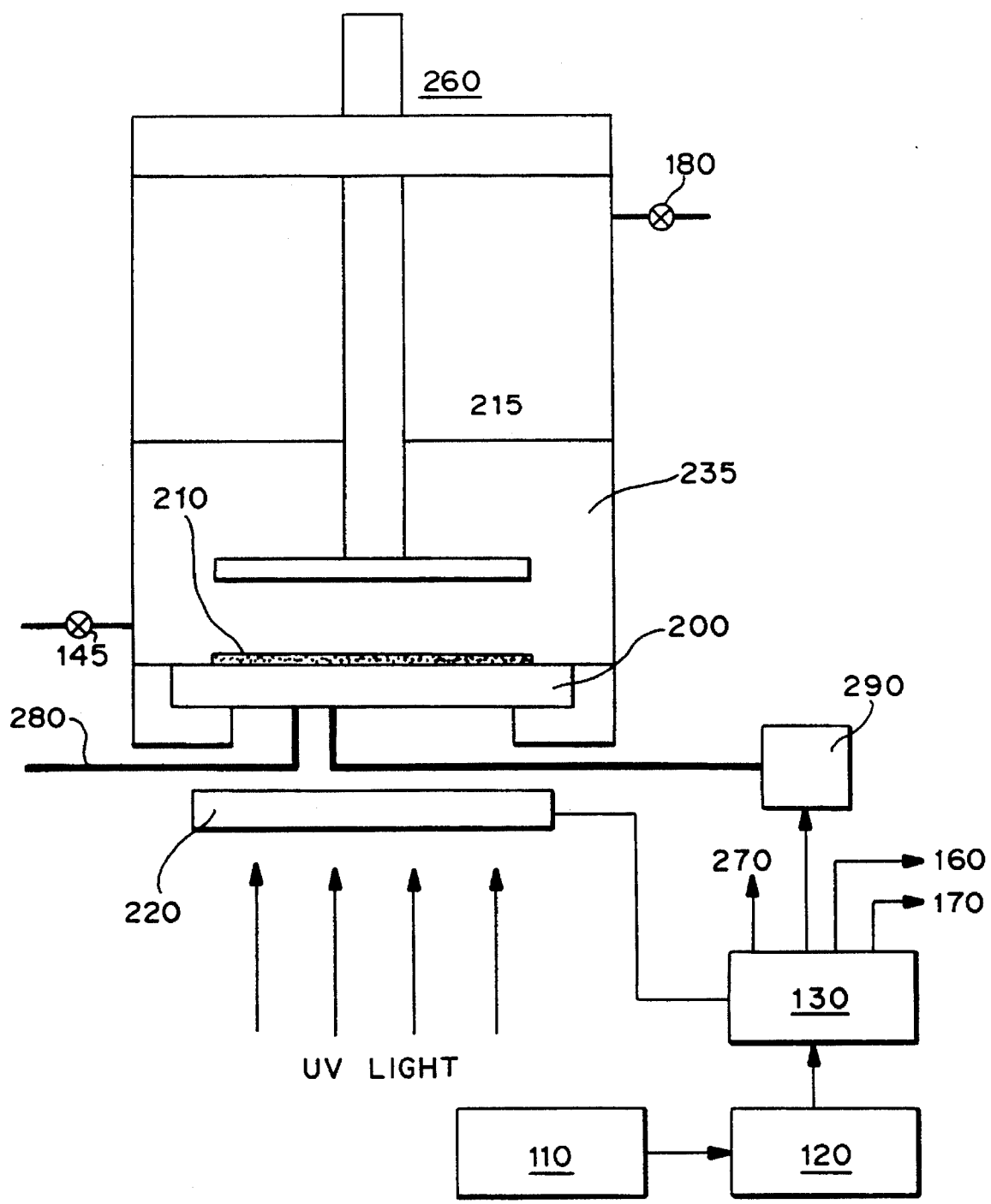
FIG. 10 is a partial cross-sectional illustration of an apparatus for the production of a three-dimensional object that includes a sequentially moving slit system (SMSS).

FIG. 10 is a partial cross-sectional illustration of an apparatus for the production of a three-dimensional object that includes a sequentially moving slit system (SMSS). As indicated, the apparatus includes a movable and adjustable slit 280, a stepping motor 290 to control the speed of slit movement, an electric shutter 220, and a control box 130 that interfaces the stepping motor 290 and other programmable pieces, as described above in FIG. 9, to a computer. The slit size can be varied according to the type of polymer precursor fluid used. The moving speed of the UV light slit is dictated by the curing time of the polymer precursor fluid, typically between 2 and 30 seconds. In a typical run, the electronic shutter 220 opens, and the slit starts moving from one side of the photomask 210 to the other side. On completion of the sequential curing, the electronic shutter is closed. As described above, once the layer is finished, the elevator 260 moves the imaged layer that sits on elevator platform 215 by a differential amount, allowing fresh (unexposed) precursor fluid to cover the underlying written layer.

Figure 11:
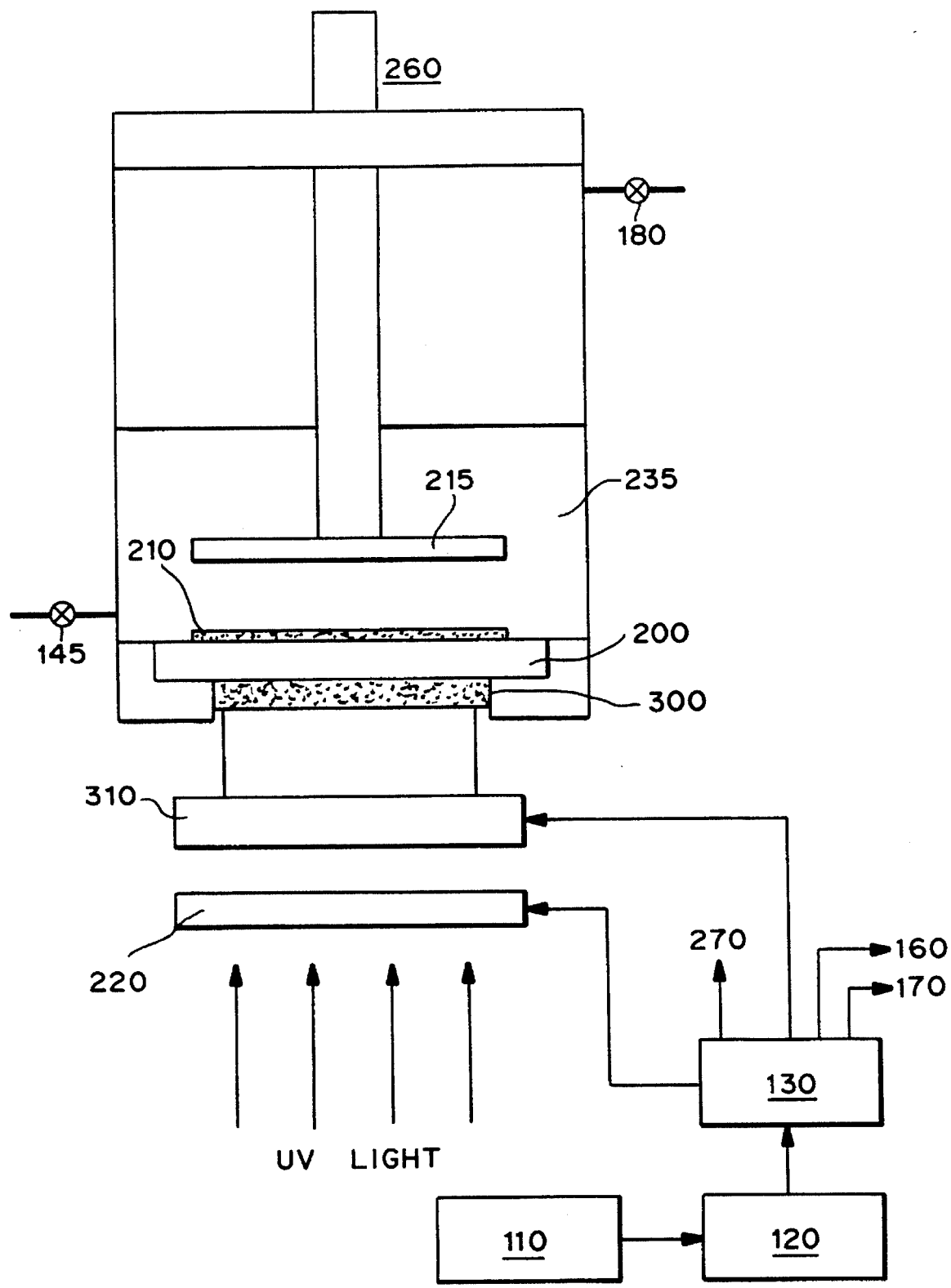
FIG. 11 is a partial cross-sectional illustration of an for the production of a three-dimensional object that includes a computerized iris diaphragm (CID).

FIG. 11 is a partial cross-sectional illustration of an apparatus for the production of a three-dimensional object in which sequential polymerization is accomplished with a computerized iris diaphragm (CID). The apparatus includes an iris diaphragm 300, a computer controlled rotation stage 310, an electronic shutter 220, and a control box 130 that interfaces the rotation stage 310, electronic shutter 220, and other programmable pieces, as indicated in FIG. 9, to a computer. The iris diaphragm is useful for the smooth control of a radially expanding or contracting beam of radiation, while keeping the energy per unit area constant. The rotational stage is used to rotate the iris diaphragm, if the iris diaphragm is not automated. The electronic shutter is opened first, and then the iris diaphragm is opened at a desired rate. After completion of cure, the electronic shutter is closed. The process is then repeated until the three dimensional object is constructed.

FIG. 13 is a schematic illustration of an apparatus for efficient release of an object formed by three dimensional stereolithography from the transparent plate to which it may become attached. The transparent plate is modified to have rises and depressions, and the depressions are filled with a soft material that has a refractive index that matches that of the transparent plate, or alternatively, are filled with air. FIG. 13 provides illustrations of two types of modified transparent plate surfaces, a grid surface and a dotted surface. Other patterns can also be used to modify the surface as desired.

A tape that has an adhesive side and a nonadhesive side is positioned over the glass plate in such a manner that the adhesive side of the tape is attached to the modified surface of the transparent plate and the nonadhesive side of the tape interfaces with the polymer precursor fluid and the object prepared from the fluid. When the object has been completed, it can easily be separated from the nonadhesive tape surface, that is flexible due to the cushioned effect of the soft filling or air in the modified transparent plate.

An example of a suitable transparent tape for quick release of the object from the transparent plate is Teflon-FEP, manufactured by E. I. DuPont Nemours and Company. One side of the Teflon-FEP film has a pressure sensitive adhesive, so that it is easy to apply to the plate. The elastic deformation of the soft material triggers vacuum release. CHR Inc. sells Teflon-FEP under the catalog name "C", and also sells other suitable transparent polyester tapes, including M52, M60, M69, and M56.

IV. Preparation of Micro and Ministructures for Microelectronic Applications

Using the three dimensional stereolithographic methods disclosed herein, high precision micro and ministructures can be prepared that are suitable for microelectronic applications. Examples of specific structures that can be made using these techniques include magnetic micromotors, toroidal transformers, metal flexure actuators, pressure transducers, microturbines, and intermeshing microcoils.

Figure 14A:
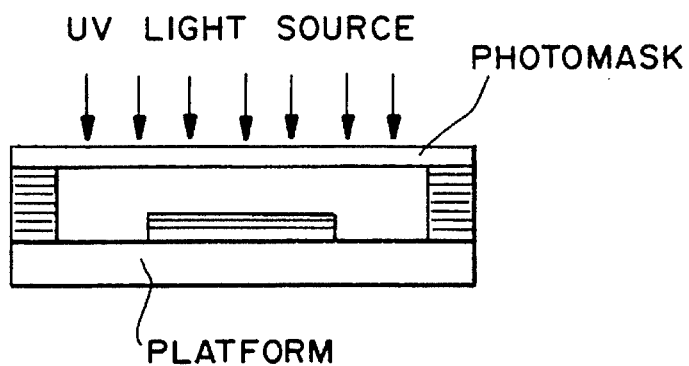
FIG. 14 is a cross-sectional schematic illustration of a method to prepare micro- and ministructures for microelectronics using the methods disclosed herein.
Figure 14B:
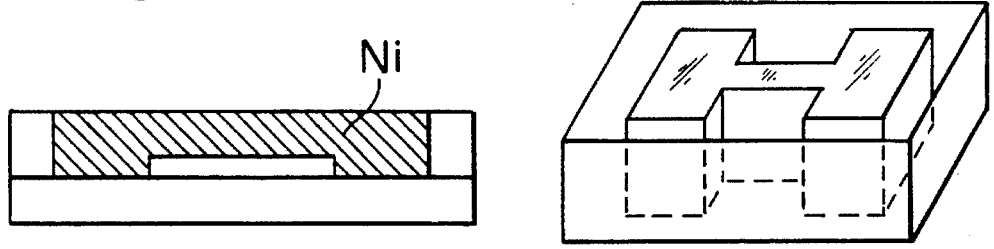
Figure 14C:
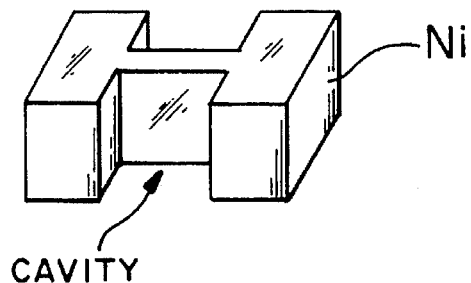
Figure 15A:
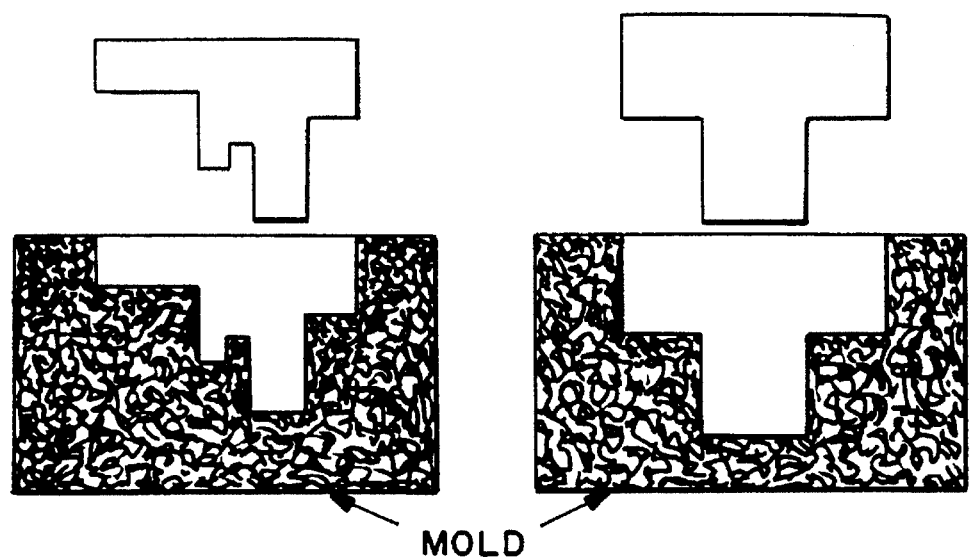
FIG. 15 is a schematic illustration of examples of structures that can be prepared using the method of three-dimensional stereolithography disclosed herein.
Figure 15B:
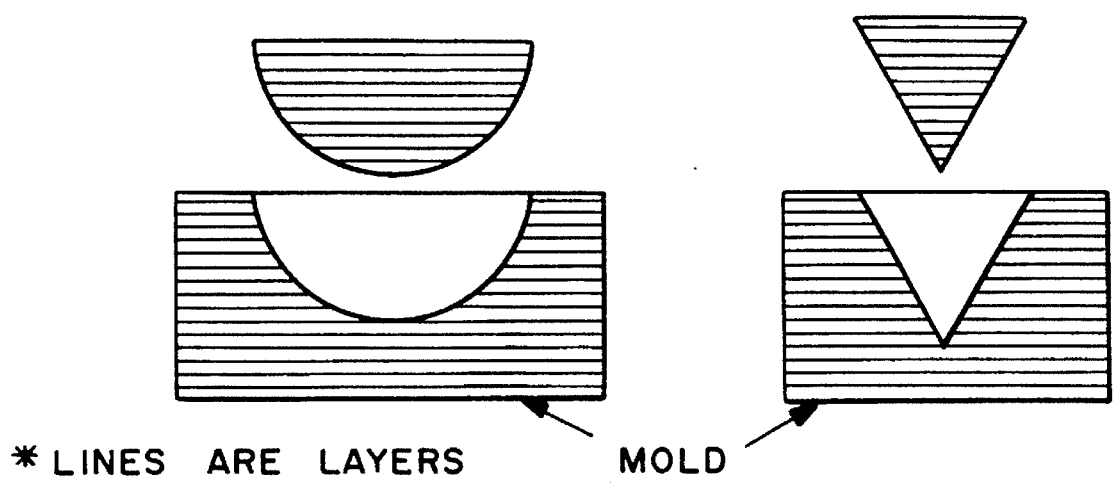

Mini and microstructures for microelectronics can be prepared using the methods disclosed herein that exhibit the precision of structures prepared using the LIGA or SLIGA techniques. As illustrated in FIG. 14, after a high precision plastic mold is completed, it is removed from the vat and electroplated, typically with nickel. The plastic mold is then removed and free metal structure is cast.

Figure 16:
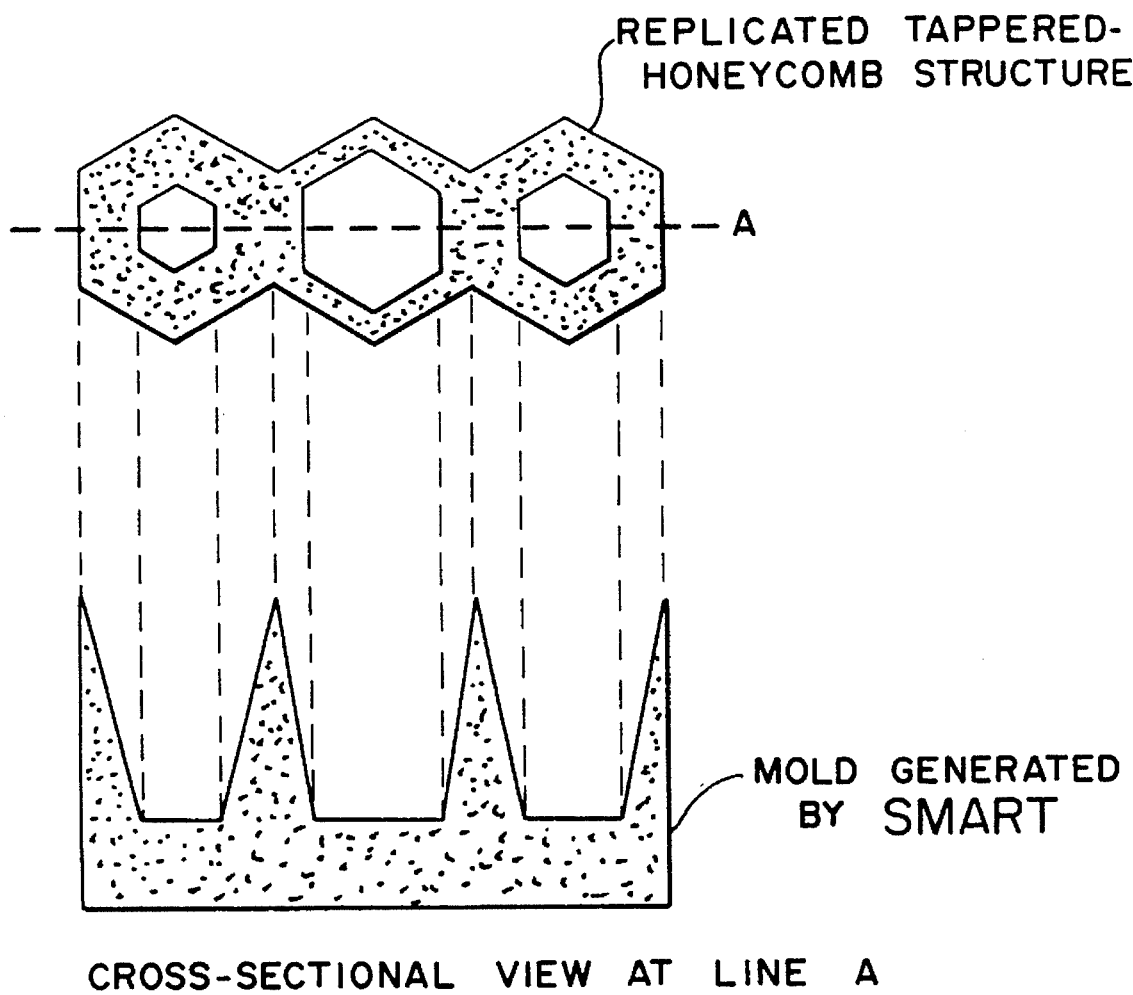
FIG. 16 is a cross-sectional view of a tapered honeycomb structure that can be generated from a mold prepared according to the methods described herein.

This technique can provide structures of highly complex shapes. The process is more flexible than the LIGA and SLIGA techniques because photomask generation through the use of CAD programs is easy and fully automated. FIG. 9 is an illustration of complex structures that can be prepared using this technique, including half domes, cones and pyramids. As the number of layers used to build the structure increases, the smoothness of the surface increases. FIG. 16 is an illustration of a tapered honeycomb shape that can be built using this process. The tapered honeycomb is useful in the area of bio-separation.

The mold building process disclosed herein represents a significant improvement over the LIGA and SLIGA techniques, in that 1) there is no need for x-ray irradiation; 2) no alignment is required (in SLIGA, the x-ray mask must be geometrically aligned to the patterned sacrificial layer and the processed substrate); 3) mold building time is reduced dramatically; 4) the mold design is simplified due to automatic photomask generation by CAD; 6) there is no structural height limit; and 7) the mold can have complex sidewall profiles and can be made of several materials in successive layers.

This invention has been described with reference to its preferred embodiments. Variations and modifications of the invention described herein will be obvious to those skilled in the art from the foregoing detailed description of the invention. It is intended that all of these variations and modifications be included within the scope of the appended claims.

We claim:

1. In the method for producing a three-dimensional project stereolithographically in a vat from a polymer precursor fluid capable of solidification in a desired pattern on exposure to a polymerization initiating source, the improvement which comprises exposing the polymer precursor fluid to the polymerization initiating source in a sequential manner, further comprising effectively closing the vat to the outside environment, imposing an elevated pressure above ambient pressure in the vat, and imposing an elevated temperature above ambient temperature in the vat, wherein the sequential polymerization is carried out with a sequentially moving slit system.

2. The improvement of claim 1, wherein the sequential polymerization is carried out using an iris diaphragm.

3. The improvement of claim 1, wherein the imposed pressure ranges between 5,000 and 8,000 psi.

4. The improvement of claim 1, wherein the polymerization initiating source is passed sequentially past a photomask prior to contacting the polymer precursor fluid.

5. The improvement of claim 1, wherein the polymerization initiating source is passed sequentially past a dot-matrix programmable mask.

6. The improvement of claim 1, wherein the photomask is achieved by pixel reflectors actuated by piezoelectricity.

7. The improvement of claim 1, wherein the photomask is achieved by microbubble technology.

* * * * *